*(12)* United States Patent
Bilic et al.

(10) Patent No.: US 12,142,161 B2
(45) Date of Patent: *Nov. 12, 2024

(54) SYSTEMS AND METHODS FOR PROVIDING INFORMATION INCORPORATING REINFORCEMENT-BASED LEARNING AND FEEDBACK

(71) Applicant: D2L Corporation, Kitchener (CA)

(72) Inventors: Jugoslav Bilic, Richmond (CA); Ivana Bilic, Richmond (CA); Justin Callison, Vancouver (CA); Manuj Aggarwal, Vancouver (CA); Stephen Michaud, Vancouver (CA); Ryan Ogg, Vancouver (CA); Juan Camilo Ramirez, Port Moody (CA); Sarbjit Sarkaria, Richmond (CA); Jian Zhou, Burnaby (CA)

(73) Assignee: D2L Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,575

(22) Filed: Nov. 11, 2021

(65) Prior Publication Data

US 2022/0180763 A1 Jun. 9, 2022

Related U.S. Application Data

(63) Continuation of application No. 16/101,934, filed on Aug. 13, 2018, now Pat. No. 11,195,428, which is a (Continued)

(51) Int. Cl.
*G06F 16/30* (2019.01)
*G06F 16/22* (2019.01)
(Continued)

(52) U.S. Cl.
CPC ............ *G09B 7/00* (2013.01); *G06F 16/2282* (2019.01); *G06F 16/2379* (2019.01); *G06F 16/907* (2019.01); *G06F 16/9535* (2019.01)

(58) Field of Classification Search
CPC .............. G06F 16/907; G06F 16/2379; G06F 16/2282; G06F 16/9535
(Continued)

(56) References Cited

U.S. PATENT DOCUMENTS

| 6,014,134 A | * | 1/2000 | Bell | .......................... | G09B 5/12 |
| | | | | | 715/705 |
| 6,299,452 B1 | * | 10/2001 | Wasowicz | ............ | G09B 17/006 |
| | | | | | 434/350 |

(Continued)

*Primary Examiner* — Tarek Chbouki
(74) *Attorney, Agent, or Firm* — SMART & BIGGAR LP

(57) ABSTRACT

Systems and methods are provided for feedback-driven provision of information in relation to a plurality of information resources. Some such methods involve: accessing information resources from one or more information resource repositories to establish a mapping between each information resource and each of the other information resources; maintaining a state table comprising a plurality of state-table records, each state-table record attributing a value to a state-action pair, the state-action pair comprising an indication of a series of one or more actions in relation to the information resources; monitoring actions of a first user in relation to the information resources; receiving a feedback metric related to interaction of the first user with the information resources; using the feedback metric as a basis for updating the values of a subset of the state-table records, the subset of the state-table records comprising state-action pairs which correspond to the monitored actions of the first user in relation to the information resources; and providing output information related to the information resources based at least in part on the updated values of the state-table records.

19 Claims, 10 Drawing Sheets

Related U.S. Application Data continuation of application No. 14/740,733, filed on Jun. 16, 2015, now Pat. No. 10,249,206, which is a continuation of application No. 13/486,923, filed on Jun. 1, 2012, now Pat. No. 9,064,017.

(60) Provisional application No. 61/492,246, filed on Jun. 1, 2011.

(51) Int. Cl.
    *G06F 16/23*     (2019.01)
    *G06F 16/907*     (2019.01)
    *G06F 16/9535*     (2019.01)
    *G09B 7/00*     (2006.01)

(58) Field of Classification Search
    USPC ........ 707/609, 687, 705, 769, 790, 813, 821
    See application file for complete search history.

(56) References Cited

U.S. PATENT DOCUMENTS

| | | | | |
|---|---|---|---|---|
| 6,614,781 B1* | 9/2003 | Elliott | ................... | H04L 65/765 |
| | | | | 370/352 |
| 7,003,560 B1* | 2/2006 | Mullen | ................. | G06Q 10/06 |
| | | | | 709/224 |
| 7,085,814 B1* | 8/2006 | Gandhi | ................... | H04L 67/14 |
| | | | | 709/208 |
| 9,336,380 B2* | 5/2016 | Spektor | ................... | H04L 63/08 |
| 2002/0160347 A1* | 10/2002 | Wallace | ................ | G09B 7/06 |
| | | | | 434/322 |
| 2005/0010469 A1* | 1/2005 | Brown | ................... | G06Q 10/10 |
| | | | | 705/7.32 |
| 2006/0127871 A1* | 6/2006 | Grayson | ................. | G09B 7/04 |
| | | | | 434/350 |
| 2006/0240394 A1* | 10/2006 | Smith | ..................... | G09B 7/00 |
| | | | | 434/350 |
| 2006/0242554 A1 | 10/2006 | Gerace et al. | | |
| 2008/0113327 A1* | 5/2008 | Larcheveque | ......... | G09B 19/00 |
| | | | | 434/350 |
| 2008/0294637 A1* | 11/2008 | Liu | .................... | G06Q 30/0601 |
| | | | | 705/26.1 |
| 2008/0295114 A1* | 11/2008 | Argade | ............... | G06F 11/3664 |
| | | | | 719/320 |
| 2009/0106312 A1* | 4/2009 | Breslau | ............... | G06F 3/04895 |
| 2009/0162827 A1* | 6/2009 | Benson | ................ | G06F 16/285 |
| | | | | 434/350 |
| 2010/0003659 A1* | 1/2010 | Edmonds | ................ | G09B 7/04 |
| | | | | 434/350 |
| 2011/0105859 A1* | 5/2011 | Popovic | ................. | A61B 5/165 |
| | | | | 600/301 |
| 2011/0177483 A1* | 7/2011 | Needham | ................ | G09B 7/00 |
| | | | | 434/322 |
| 2012/0310961 A1* | 12/2012 | Callison | ............. | G06F 16/2379 |
| | | | | 707/756 |
| 2017/0262529 A1* | 9/2017 | Chim | ................. | G06F 16/3329 |

\* cited by examiner

USER ACTION LOG (FOR USER ID=x)

| USER ID | STATE | ACTION | TIME STAMP START | TIME STAMP END |
|---|---|---|---|---|
| x | {NULL} | INTERACT WITH RESOURCE 1 | t1,start | t1,end |
| x | {1} | INTERACT WITH RESOURCE 3 | t3,start | t3,end |
| x | {1,3} | INTERACT WITH RESOURCE 4 | t4,start | t4,end |
| x | {1,3,4} | INTERACT WITH RESOURCE 7 | t7,start | t7,end |
| x | {1,3,4,7} | INTERACT WITH RESOURCE 6 | t6,start | t6,end |
| x | {1,3,4,7,6} | ASSESSMENT A4 | tA4,start | tA4,end |

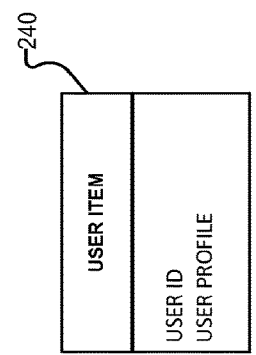

INFORMATION RESOURCE ITEM

RESOURCE ID
RESOURCE TYPE
RESOURCE URI

ACTIVITY ITEM

USER ID
RESOURCE ID
TIME STAMP

FEEDBACK ITEM

USER ID
RESOURCE ID
TIME STAMP
FEEDBACK METRIC

USER ITEM

USER ID
USER PROFILE

FIGURE 2D

SYSTEMS AND METHODS FOR PROVIDING INFORMATION INCORPORATING REINFORCEMENT-BASED LEARNING AND FEEDBACK

RELATED APPLICATIONS

This application is a continuation of U.S. patent application Ser. No. 16/101,934, filed Aug. 13, 2018, which is a continuation of U.S. patent application Ser. No. 14/740,733, filed Jun. 16, 2015, issued as U.S. patent Ser. No. 10/249,206, which is itself a continuation of U.S. patent application Ser. No. 13/486,923, filed Jun. 1, 2012, issued as U.S. Pat. No. 9,064,017, which claims the benefit of U.S. Provisional Patent Application No. 61/492,246, filed on Jun. 1, 2011, all of which are hereby incorporated herein by reference.

TECHNICAL FIELD

The invention relates to providing information based on feedback. Particular embodiments provide systems and methods for feedback-driven provision of information in relation to a plurality of information resources. In some embodiments, the information provided comprises recommended actions for users in connection with information resources, which may include educational information or content. Provided information and/or recommended actions may be personalized for individual users and/or groups of users.

BACKGROUND

Learning is a continuous and integral part of daily life. Humans never stop learning. Traditional educational techniques take place in the classroom, lecture hall or the like. However, traditional classroom learning tends to prevent and/or discourage students from taking full advantage of the available technology—e.g. educational resources available online, educational resources available in accessible libraries, educational resources available from other text books and/or the like. Also, traditional classroom learning tends to not take full advantage of individual abilities and styles of learning. Not all students learn the same way; some learn primarily visually, some learn primarily textually, and some learn primarily when allowed to put ideas into practice. There is a general desire to improve educational and/or learning techniques by taking into account the personal interests and/or learning styles of individual students.

The internet, which is accessible to many students, provides an often overwhelmingly large amount of content. Other sources of educational resources (e.g.1 libraries, book stores, educational service providers) can also provide large amounts of content. Such content may be related to the academic interests and needs of students, but is sometimes completely irrelevant. Unknowingly, due, for example, to the amount of content and/or a lack of organization of educational resources tailored to a student's needs, a student can make poor choices about what educational resources to study or observe, and for how long. If a student is motivated to learn, he or she can be persuaded to choose educational resources that suit their learning style and pace; however, it can be difficult to locate such resources.

There is a general desire to provide students with recommendations for actions in connection with educational information resources. There is a corresponding desire that such recommendations be based on feedback so that the recommended actions may help the student learn relevant subject matter more effectively and/or efficiently.

Issues relating to the overwhelming nature of amount, variety and/or lack of organization of content available from the internet and from other sources is not limited to educational content. These issues apply generally to other information resources available from such sources. There is a general desire to provide users with feedback-driven recommendations for actions in connection with such information resources.

Feedback can be a powerful tool for assessing the value of information to a user or users. There is a general desire for techniques to provide feedback-driven information retrieval.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention:

FIG. 2A shows a resource item data structure suitable for use by the Figure learning system according to a particular embodiment;

FIG. 2B shows an action item data structure suitable for use by the FIG. 1 learning system according to a particular embodiment;

FIG. 2C shows a feedback item data structure suitable for use by the FIG. 1 learning system according to a particular embodiment;

FIG. 2D shows a user item data structure suitable for use by the FIG. 1 learning system according to a particular embodiment;

FIG. 3A is a schematic example of a user action log suitable for use by the action interface of the FIG. 1 learning system according to a particular embodiment;

FIG. 3B is a schematic resource-space (or model-space) diagram corresponding to the FIG. 3A example user action log;

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide methods and systems for providing information based on feedback. Feedback may be incorporated into the information provided using reinforcement learning. Information provided by the methods and systems of particular embodiments can comprise information about feedback-driven recommendations for actions in connection with accessible information resources. In some embodiments, information resources comprise educational information or content. Feedback may comprise one or more feedback metrics which may be related to a user's interaction with the information resources. In particular embodiments, feedback comprises an assessment which comprises a feedback metric (or metrics). In particular embodiments, reinforcement learning techniques use these feedback metrics to ascribe, or otherwise determine, one or more values for an action or a series of actions taken by a user in connection with the information resources. Such values may be used as estimates of the value of the same action or series of actions for other users.

The set of accessible information resources may be referred as a state space and information about current position of a user in the state-space (e.g. a history of the information resources with which the user has interacted) may be referred to as the user's state. To move from one state to another within the state-space, a user interacts with an information resource. Such interaction of the user with an information resource may be referred to as an action. A current state of a user coupled with an action which will transition the user to a new state may be referred to as a state-action pair. The interaction of states and actions and how an action taken by a user transitions the user from one state to another state may be referred to as a model. In particular embodiments, reinforcement learning techniques may use feedback to ascribe, or otherwise determine, one or more values for state-action pairs. State-action pairs together with their corresponding values may be maintained in a state table. Such a state table may be used as a basis for providing information about recommended actions to a variety of users. Information provided (possibly including recommended actions) may be personalized for individual users and/or groups of users.

Figure 1:
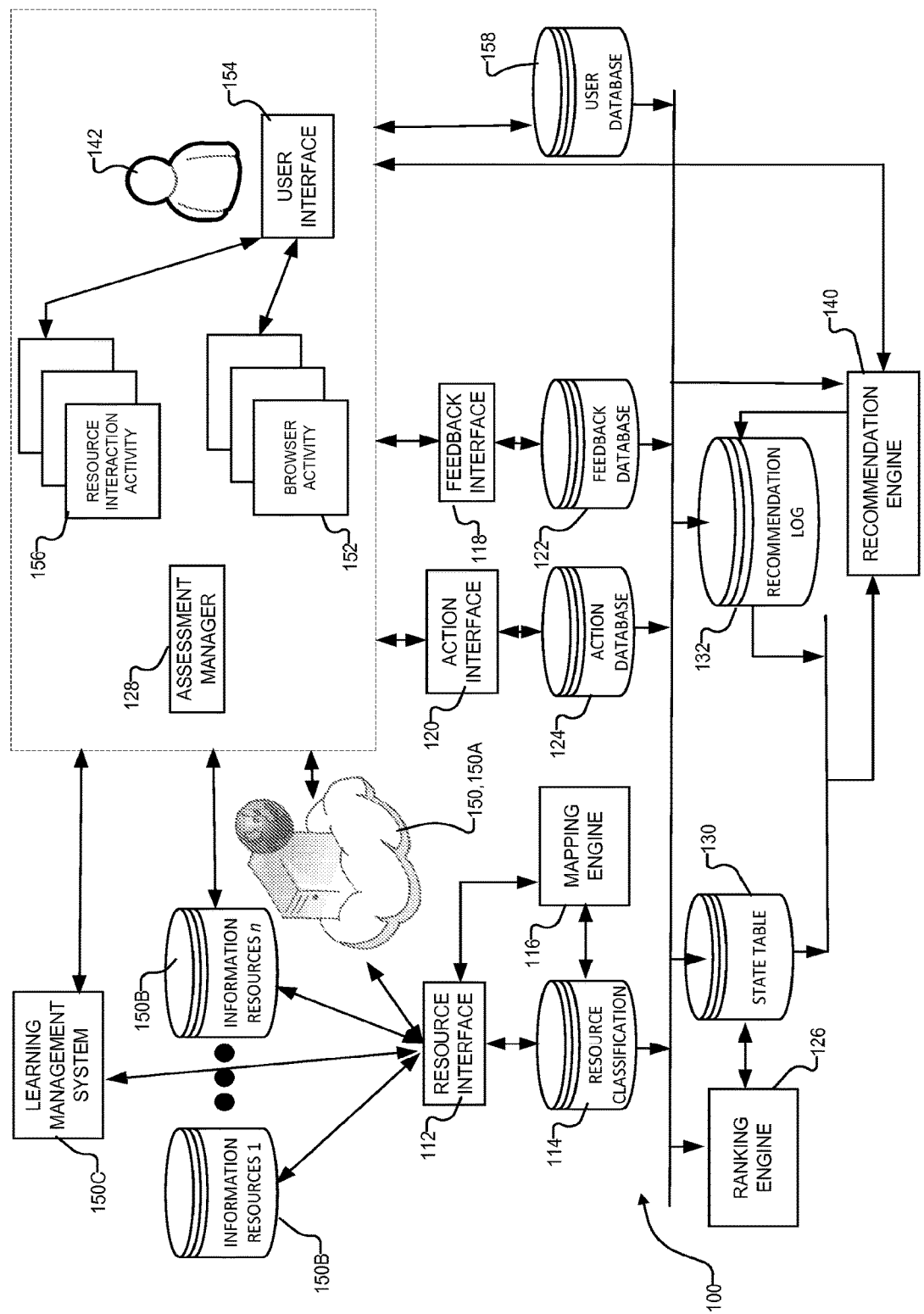
FIG. 1 is a schematic system diagram of a possible architecture of a learning system incorporating reinforcement learning techniques according to a particular embodiment.

FIG. 1 is a schematic system diagram of a possible architecture of a system 100 capable of feedback-driven information retrieval according to a particular embodiment.

In the FIG. 1 embodiment, system 100 comprises a learning system and the feedback-driven information retrieved by learning system 100 comprises feedback-driven recommendations for user actions in relation to information resources. Such information resources may comprise educational information or content. Learning system 100 can access information resources from one or more information resource repositories 150. In the illustrated embodiment, information resource repositories include the internet 150A, one or more general purpose information resource databases 150B and information resources which may be accessed from a learning management system 150C. In other embodiments, learning system 100 can interact with a different number (more or fewer) of information resource repositories, different types of information resource repositories and/or the like.

In some embodiments, information resource repositories 150 may comprise electronically accessible information repositories. In some embodiments, information resource repositories 150 may be accessible by user 142 and/or by learning system 100 over a suitable data communications network (e.g. the internet, a private network and/or the like). In some embodiments, information resources provided on a given information resource repository 150 may be created and/or managed by more than one entity. By way of non-limiting example, the internet (repository 150A) is completely open-ended and accessible information resources provided on the internet (repository 150A) may be contributed by an arbitrary number of independent content providers. In another non-limiting example, a particular information resource repository 150 may comprise a topical information repository 150 which may accept information resources from a number of expert contributors. For example, an information repository 150 could be a topical repository 150 on the topic of astronomy, in which case it may accept contribution of information resources from a number of astronomy experts. Information resource repositories 150 described herein are merely representative examples of suitable types of information repositories 150 and, unless specifically claimed, are not meant to be limiting.

Information resource repositories 150 may hold a wide variety of information resources having a corresponding wide variety of forms. By way of non-limiting example, information resources can comprise textual resources, audio resources, image-based resources, video resources, interactive resources, questions, assessments, executable applications, instructions or directives on how to access and/or use other resources, discussion posts or forums, instructor notes, hints, blogs, any combinations or sub-combinations of these types of resources and/or the like. In general, learning system 100 can accommodate any form of informational resource. In some types of repositories 150 (such as database 150B or learning management system 150C), information resources may be pre-organized or otherwise mapped or classified in some manner within the repository prior to being made accessible to learning system 100. This is not necessary, however. In some repositories 150 (such as internet 150A), information resources are not organized in any particular manner.

Learning system 100 interacts with information resource repositories 150 through information resource interface (or for brevity resource interface) 112. In particular embodiments, resource interface 112 is implemented as an application program interface (API) capable of electronically accessing information resources from, or otherwise interacting with, repositories 150, although this is not necessary. Resource interface 112 may pull information resources from repositories 150 and/or repositories 150 may push information resources to resource interface 112. In some embodiments, resource interface 112 may pull information resources from one or more repositories (e.g. the internet 150A) while other repositories (e.g. learning management system 150C) push information resources to resource interface 112. In one particular example embodiment, resource interface 112 may crawl one or more of repositories 150 to gather data in respect of the information resources accessible therein.

In some embodiments, resource interface 112 creates information resource item data structures which may be stored in information resource and classification database 114 for access by the other components of system 100. FIG. 2A shows an information resource item data structure (or for brevity resource item) 200 suitable for use by learning system 100 according to a particular embodiment. Resource item 200 of the illustrated embodiment comprises three fields: resource ID; resource type; and resource URI. In other embodiments, resource item data structure 200 may comprise additional or alternative fields. Resource ID is a field which uniquely identifies a particular resource item. Resource URI is a pointer to the information resource item in one or more of repositories 150. Where an information resource item 200 references content from the internet 150B, resource URI may comprise the actual universal remote locator (URL) corresponding to the information resource. In general, however, and particularly where resources come from a repository 150 other than the internet, the resource URI field of resource item 200 may comprise any suitable pointer to the underlying information resource.

Resource item 200 also comprises a resource type field. In one particular embodiment, a resource item may be classified into one of four types: general information resource, taxonomy, assessment and question. In such embodiments, a resource item 200 with an assessment type means that the underlying information resource provides some capacity for testing the user or otherwise providing feedback as to the user's progress in connection with one or more learning objectives. In some embodiments, an assessment may comprise a plurality of questions which may be posed to a user and then evaluated. This is not necessary, however, and in general, an assessment can comprise any means of providing user feedback in connection with one or more pedagogical objectives.

Assessment type resource items can come from a variety of different sources. By way of non-limiting example, a curriculum-setting authority (such as a school board or a government education branch and/or the like) may provide standardized assessments in the form of tests or the like; private entities (such as the proprietors of learning management system 150C and/or resource databases 150B) may create assessments; individual teachers (who may or may not be affiliated with repositories 150) may create assessments; and/or the like. In some embodiments, learning management system 100 may comprise a specialized user interface (not shown) for adding independently created assessments, but this is not necessary.

A question type resource item 200 may be the building block of an assessment type resource item. That is, an assessment type resource item may comprise a plurality of question type resource items. As explained in more detail below, in some embodiments, it can be useful to parse assessment type resource items into questions, so that diagnostic assessments can be used to make personalized recommendations for a user. Taxonomy type resource items are described in more detail below in the context of mapping engine 116.

General type resource items may comprise resource items other than assessment type resource items and question type resource items. Resource items of the general type may be referred to herein as information resource or just resources. As discussed above, information resources may have a wide variety of forms. By way of non-limiting example, information resources can comprise textual resources, audio resources, image-based resources, video resources, interactive resources, questions, assessments, executable applications, instructions or directives on how to access another resources, discussion posts or forums, instructor notes, hints, blogs, any combinations or sub-combinations of these types of resources and/or the like. It will be appreciated that different information resources may have different pedagogical value. This is particularly the case when information resources are accessed from a wide variety of repositories 150 which may include the internet 150B. As discussed in more detail below, learning system 100 may use feedback to provide information about recommended actions for users in relation to information resources that will help such users achieve their learning objectives.

In some embodiments, learning system 100 may comprise an assessment creation engine (not shown) which may create one or more questions and/or assessments based on accessible information resources. Assessments created in this manner may comprise a plurality of question type resource items which may be determined by mapping engine 116 (discussed further below) to have a threshold degree of similarity or some other suitable relationship with one another.

Learning system 100 is not limited to the four resource types discussed herein. In some embodiments, learning system 100 may comprise other additional or alternative resource types. In some embodiments, the assessment type, question type and/or general type resource items could be further sub-classified. By way of non-limiting example, general type resource items could be further sub-divided into video type, graphic type, textual type, interactive type, etc. Similarly, by way of non-limiting example, assessment type resource items could be sub-classified into: random type (which comprises a random plurality of questions), adaptive type (which comprises questions based, at least in part on answers given to previous questions) and/or the like. Still further, by way of non-limiting example, question type resource items could be sub-classified into: multiple choice type, short answer type, true/false type and/or the like.

Referring back to FIG. 1, resource interface 112 may interact with mapping engine 116, which may perform semantic analysis (or other data mining analysis) in relation to accessible information resources. Semantic analysis, which may be performed by mapping engine 116 using any suitable algorithm(s) or technique(s), may be used to establish mappings or other similar relationships as between information resources accessible to resource interface 112. For example, mapping engine 116 may establish such mappings as between information resources in any particular repository 150 and/or across all accessible repositories 150. Semantic analysis may be performed by mapping engine 116 on accessible information resources regardless of whether such information resources are pushed to, or pulled by, resource interface 112.

In particular non-limiting embodiments, the semantic analysis performed by mapping engine 116 comprises clustering (e.g. hierarchical agglomerative clustering (HAC))

and/or some other suitable mapping technique(s) which may be based on semantic analysis. Such mapping techniques may provide metrics which assess the semantic similarity of any one information resource item to other information resource items. One non-limiting example of a metric which may be used to assess similarity in the mapping techniques performed by mapping engine 116 comprises cosine similarity, although it will be appreciated that other suitable similarity algorithms and/or metrics could be used. It will be appreciated that mapping techniques (such as HAC) represent one class of semantic analysis techniques and that mapping engine 116 may additionally or alternatively make use of other semantic analysis (or data mining analysis) techniques.

Mapping engine 116 may be generally capable of establishing mappings to assess the similarity of any accessible information resources. In some embodiments, mapping engine 116 may initially (or otherwise) be provided with taxonomy information (not explicitly shown). Such taxonomy information may comprise taxonomy type information resources and may be provided to mapping engine 116 through resource interface 112, from resource and classification database 114 or otherwise. Such taxonomy information may comprise a set of one or more topics, skills and/or objectives for learning. By way of non-limiting example, taxonomy information may include course syllabi, table(s) of contents and/or the like. A taxonomy type information resource may be the base unit of a set of taxonomy information. Taxonomy type information resources may be presented to mapping engine 116 as documents or the like. For each such taxonomy type information resource, mapping engine 116 may then determine mappings between the taxonomy type information resource and other information resources accessible to mapping engine 116 (e.g. general type information resources, question type information resources, assessment type information resources and/or other taxonomy type information resources).

In the illustrated embodiment, a user 142 interacts with learning system 100 via a user interface 154. In some embodiments, user interface 154 may comprise a specialized (e.g. independent) application which, when executed, provides user 142 with a comprehensive interface to learning system 100. In such embodiments, user 142 may access resources from repositories 150 directly via user interface 154. In such cases, user interface 154 may create (or may have access to) resource interaction activity data 156. For example, some learning management systems (LMS) which may provide access to repositories 150 may generate resource interaction activity data 156 in the form of LMS logs or the like. By way of non-limiting example, resource interaction activity data 156 may comprise an identification of user action (e.g. the resource ID of resources that user 142 has accessed or otherwise interacted with) and a temporal indication (e.g. one or more time stamps) of when and/or how long user 142 interacted with a particular resource. In some embodiments, resource interaction activity data 156 may comprise the output of LMS gradebook(s) or the like which may provide grades for assessments taken by user 142. In other embodiments, an assessment manager 128 may be provided to determine or otherwise obtain grades for assessments taken by user 142. As discussed in more detail below, such grades may be used by system 100 as feedback metrics.

Additionally or alternatively, in some embodiments, user interface 154 to system 100 (or some other monitoring agent which may be present on the computing device of user 142) may operate passively while user 142 accesses information resources from repositories 150 via another independent application program (not expressly shown). In such embodiments, user interface 154 to system 100 may operate in parallel with, or in the background of, the independent application. The independent application may provide an independent user interface through which user 142 accesses information resources from repositories 150. By way of non-limiting example, such an independent could comprise an internet browser or a LMS user interface application. In the case of an internet browser application, for example, user interface 154 to system 100 (or some other monitoring agent which may be present on the computing device of user 142) may passively monitor the actions of user 142 as they interact with resources from repositories 150 via the internet browser and may create (or may have access to) browser activity data 152. Like resource interaction activity data 156, browser activity data 152 may comprise an identification of user actions (e.g. the resource ID of resources that user 142 has accessed or otherwise interacted with) and a temporal indication (e.g. one or more time stamps) of when and/or how long user 142 interacted with a particular resource. In some embodiments, browser activity data 152 may comprise grades for assessments taken by user 142. In other embodiments, an assessment manager 128 may be provided to determine or otherwise obtain grades for assessments taken by user 142. As discussed in more detail below, such grades may be used by system 100 as feedback metrics.

System 100 may be accessed by a plurality of users 142, who may use the same user interface 154 or different user interfaces 154. To keep track of individual users 152, system 100 may create user item data structures which may be stored in user database 158 for access by the other components of system 100. FIG. 2D shows a user item data structure 240 suitable for use by learning system 100 according to a particular embodiment. User item data structure 240 of the FIG. 2D embodiment comprises two fields: user ID and user profile. User ID is a field which uniquely identifies a particular user. The user profile field is optional and may comprise any of a wide variety of information specific to a particular user, including (by way of non-limiting example): the user's education stage (e.g. grade, year, level and/or the like), the user's level of mastery of a particular learning objective, a preferred learning style of a particular user, user's learning disability and/or the like. In some embodiments, the user profile field could be further sub-classified to provide user item data structure 240 with a plurality of user profile sub-fields. User data structure 240 shown in the FIG. 2D includes two fields: user ID and user profile. In other embodiments, user data structure 240 may comprise additional or alternative fields.

Learning system 100 monitors user interaction with resources from repositories 150 through action interface 120. In particular embodiments, action interface 120 is implemented as an application program interface (API) capable of electronically tracking the actions of user 142, although this is not necessary. Action interface 120 provides a link between resource items 200 (FIG. 2A) and user items 240 (FIG. 2D). Action interface 120 may pull user action data from any one of more of: user 142, browser activity data 152, resource interaction activity data 156, user interface 154, assessment manager 128 and/or the like. This interaction is shown schematically in FIG. 1 by the dashed box around user 142, browser activity data 152, resource interaction activity data 156, user interface 154 and assessment manager 128. In some embodiments, action interface 120 may pull user action data from one or more of repositories 150 (not shown). Additionally or alternatively, any one or more of browser activity data 152, resource interaction activity data 156, user interface 154, assessment manager 128, repositories 150 and/or the like can push user action data to action interface 120.

Action interface 120 may track the actions of users 142 in relation to the resources in repositories 150 using an action log which may be stored in action database 124. In one particular embodiment, each record in an action log stored in action database 124 is based on an action item. FIG. 2B shows an action item data structure 220 suitable for use by learning system 100 according to a particular embodiment. Action item data structure 220 of the FIG. 2B embodiment comprises three fields: user ID; resource ID and time stamp(s). As discussed above, user ID and resource ID uniquely identify a particular user and a particular information resource item. The time stamp field(s) of action item data structure 220 may comprise a log of the time(s) during which a particular user accessed a particular resource item. In some embodiments, time stamp field(s) could comprise a single time stamp field indicating that the user accessed the information resource at a particular time or for a particular duration. In other embodiments, time stamp field(s) could include a plurality of time stamps which could be used to provide more comprehensive information about when and for how long the user accessed the information resource. For example, multiple time stamps could be used to indicate that the user accessed the resource between 13:30 and 14:14 on 21 May 2012 and between 13:40 and 14:45 on 22 May 2012.

Learning system 100 procures feedback using feedback interface 118. In particular embodiments, feedback interface 118 is implemented as an application program interface (API) capable of electronically procuring feedback metrics, although this is not necessary. Feedback interface 118 provides learning system 100 with feedback metrics (discussed further below). By way of non-limiting example, feedback metrics obtained by feedback interface 118 may comprise feedback relating to the interaction of user 142 with assessments (e.g. resource items of the assessment type). When a user 142 interacts with assessment type resource items, an assessment grade or some other suitable assessment metric may be generated. In one example, such an assessment metric could be generated by the gradebook (not shown) of a LMS 150C (or any other LMS) and reported as part of resource interaction activity data 156. Feedback interface 118 may pull feedback metrics (e.g. user assessment grades or metrics) from any one of more of: user 142, browser activity data 152, resource interaction activity data 156, user interface 154, assessment manager 128 and/or the like. This interaction is shown schematically in FIG. 1 by the dashed box around user 142, browser activity data 152, resource interaction activity data 156, user interface 154 and assessment manager 128. Additionally or alternatively, any one or more of user 142, browser activity data 152, resource interaction activity data 156, user interface 154, assessment manager 128 and/or the like can push user assessment data to feedback interface 118. In some embodiments, feedback interface 118 can additionally or alternatively receive feedback metrics from external source (not shown), such as instructors, external assessment source(s) (which may include other system(s) capable of providing feedback), peers and/or the like.

Feedback interface 118 may optionally track the feedback metrics of users 142 in a feedback database 122. FIG. 2C shows a feedback item data structure 230 suitable for use by learning system 100 according to a particular embodiment. Feedback item data structure 230 of the FIG. 2B embodiment comprises four fields: user ID; resource ID; time stamp(s); and feedback metric. As discussed above, user ID and resource ID uniquely identify a particular user and a particular information resource item. The time stamp field(s) of feedback item data structure 230 may be similar to those of action item data structure 220 discussed above. In one particular embodiment, the time stamp field(s) of feedback item data structure 230 comprise a log of the time(s) during which a particular user accessed a particular assessment type resource item. The feedback metric field of feedback item data structure 230 may comprise one or more numbers which may, in the case of feedback derived from user interaction with an assessment type resource, indicate the performance of the user in relation to the identified assessment. By way of non-limiting example, the feedback metric field of feedback item data structure 230 may comprise a percentage grade of the identified assessment for the identified user.

Feedback which may be provided to, or otherwise accessed by, feedback interface 118 is not limited to assessments. In general, feedback may comprise any vehicle for providing a feedback metric. As discussed in more detail below, the feedback metric may be related to a user's sequence of actions since the last time that feedback was provided (e.g. interacting with a particular set of information resources, interacting with information resource(s) a number of times and/or the like). Non-limiting examples of other types of feedback include: user evaluation of information resources or actions taken in relation to information resources; instructor evaluation of user comprehension or mastery of a particular learning objective; completion of a threshold number of actions in relation to information resources which may be ascribed a suitable feedback metric; completion of one or more particular actions in relation to information resources which may be ascribed a suitable feedback metric and/or the like. Such other forms of feedback may, but need not necessarily be represented in feedback database 122 by feedback item data structure 230. In some embodiments, feedback item data structures having different fields may be used to represent such other forms of feedback.

In some embodiments, an assessment manager 128 may be provided which may perform the task of generating or otherwise obtaining and/or managing the feedback metrics for feedback interface 118. In some embodiments, assessment manager 128 can reside on the computing device of user 142 and can interact with different sources of feedback, such as resource interaction activity data 156 (which may include information from the gradebook of a LMS system), browser activity data 152, user 142, user interface 154 and external feedback sources (not shown).

As discussed above, when a user 142 is interacting with resources from repositories 150, action interface 120 may keep a log of the user's actions in relation to the information resources. FIG. 3A is a schematic example of a user action log 250 suitable for use by action interface 120 according to a particular embodiment. It will be appreciated that there are many users who may be interacting with learning system 100 at any given time. User action log 250 of the FIG. 3A embodiment is sorted by a particular user ID field—i.e. user action log 250 shown in FIG. 3A represents the actions of a particular user having user ID=x. Learning system 100 may create a similar user action log for each user 142.

In the FIG. 3A embodiment, each row (e.g. each record) of user action log 250 represents one action and comprises four fields: user ID, state, action, start time stamp and end time stamp. The state field represents actions that the user has done prior to the action the user is currently performing.

The action field represents the action that the user is currently doing. Possible actions for the action field of user action log 250 may correspond to the types of information resources. As discussed above, in one particular embodiment, information resources may have a type of assessment, question, taxonomy item or general resource; in such embodiments, possible actions include various forms of interaction with these types of information resources. By way of non-limiting example, possible forms of interaction with these resources include reading, viewing, listening to and/or taking a more active part in a general resource, answering a question, taking an assessment and/or interacting with an instructor in relation to any one of these resources. The action field of user action log also includes a resource ID reference. For example, in the first row (record) of the FIG. 3A example log, the user is interacting with the resource item with resource ID=1, in the second row, the user is interacting with the resource item with resource ID=3 and so on. The time stamp start and end fields respectively represent the start and end times of a particular action. In some embodiments, it is not necessary to maintain both start and end time stamps, and each record of user action log may comprise a single time stamp field (e.g. start time). Comparing action data item 220 (FIG. 2B) and user action log 250, it can be seen that each record of user action log 250 includes information which may be drawn from a corresponding action item of the form of action item 220 (FIG. 2B).

FIG. 3B is a schematic resource-space diagram 255 corresponding to the FIG. 3A action log 250. In the FIG. 3B representation 255, each square corresponds to a resource item and is labeled with its corresponding resource ID. The circles in FIG. 3B represent actions that the user has done and the dashed line represents the path that the user took between actions. FIG. 3B shows that the user progressed through interacting with resource items 1, 3, 4, 7 and 6 before taking assessment A4.

Figure 4A:
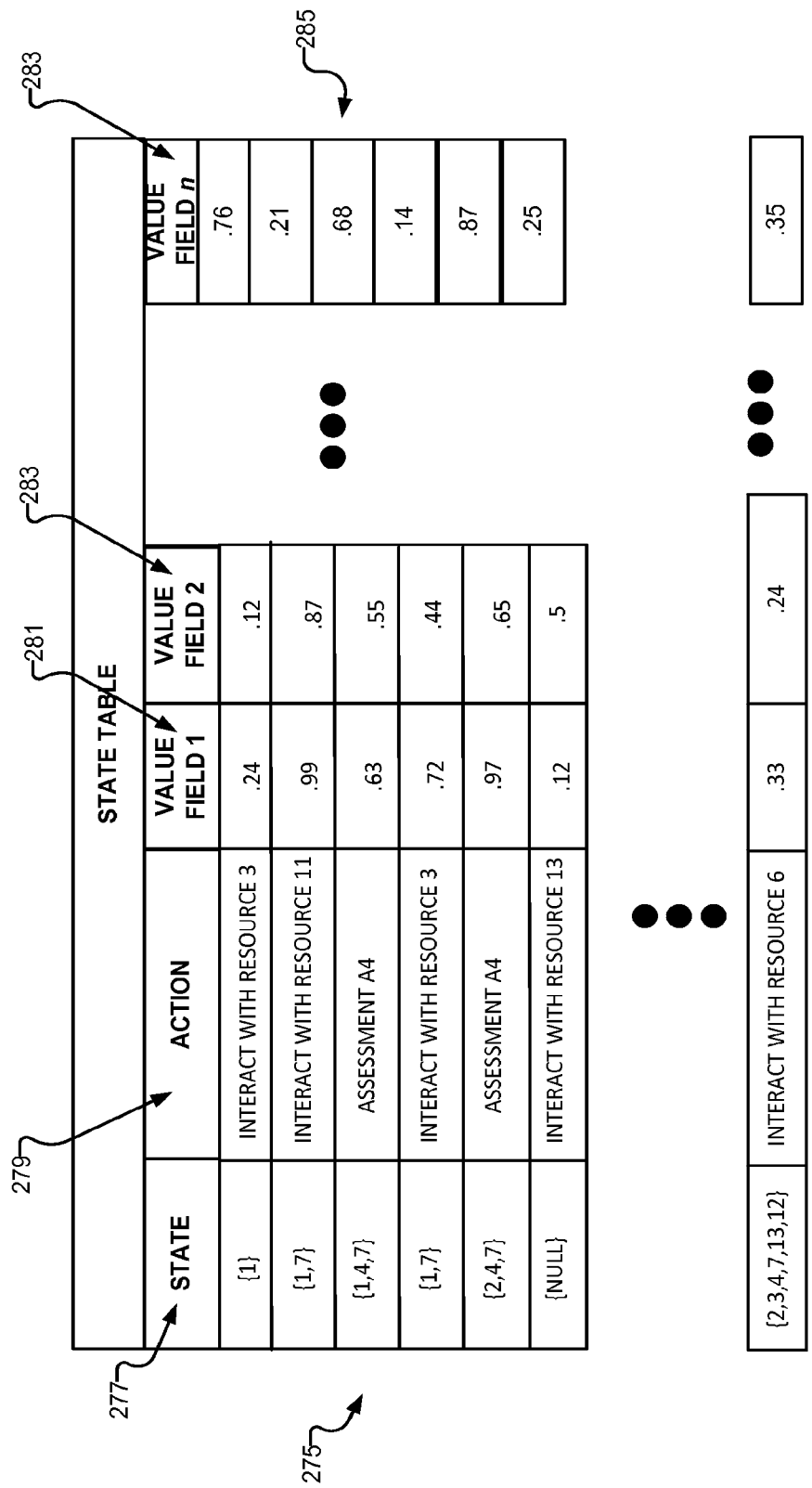
FIG. 4A shows an example of a state table which may be created by a ranking engine of the FIG. 1 learning system according to a particular embodiment.

Referring again to FIG. 1, learning system 100 of the illustrated embodiment comprises a ranking engine 126 which may use information from resource classification database 114, action database 124, feedback database 122, user database 158 and/or any other information available to system 100 to maintain relationships between information resource items and their respective values. These relationships may be maintained by ranking engine 126 in a state table 130. FIG. 4A shows an example of a state table 275 which may be used by ranking engine 126 according to a particular embodiment. In the FIG. 4A embodiment, each row (record) in state table 275 comprises a plurality of fields: a state field 277; an action field 279; and at least one value field 281. As discussed in more detail below, state table 275 may optionally comprise a plurality of value fields. In the illustrated embodiments, in addition to the at least one value field 281, state table 275 also comprises optional value fields 2-n indicated by reference numeral 283. As discussed in more detail below, optional value fields 283 may comprise customized or personalized value information.

State field 277 represents a state of a user prior to the action 279 of the current record. State field 277 may comprise references to the resource IDs of particular resource items with which users may interact. For example, the third record 285 of the FIG. 4A example state table 275 has a state field 277 which indicates a state where a user has previously interacted with resource items with resource IDs of 1, 4 and 7. Action field 279 represents a next action. As with the action field of user log 250 (FIG. 3A), action field 279 of state table 275 includes possible actions which correspond to the information resource types (e.g. general information resources, assessments and questions) being used by resource interface 112 of learning system 100 together with a resource ID reference. For example, the third record 285 of the FIG. 4A example state table 275 has an action field 279 which indicates the action of taking an assessment with resource ID=A4. A particular state and a particular action of a single record of state table 275 may be referred to herein as a state-action pair.

As discussed above, in the illustrated embodiment, state table 275 includes at least one value field 281 which may represent the value that system 100 associates with performing a corresponding action, given a corresponding state. For example, the third record 285 of state table 275 has a value field 281 which indicates if a user had interacted with resource items with resource IDs={1, 4, 7} (corresponding to the state field 277 of record 285), the next action of interacting with assessment A4 (corresponding to the action field 279 of record 285) has a value of 0.63. Value field 281 may comprise a numerical metric, such that value fields 281 of particular state table records may be easily compared to one another. In the case of the FIG. 4A example, given a state 277 corresponding to a user having interacted with resource IDs={1,7}, system 100 considers there to be relatively more value in the next action being interacting with resource ID=11 (value=0.99) than interacting with resource ID=3 (value=0.72).

In the illustrated embodiment, state table 275 comprises optional additional value fields 283. Such additional value fields 283 may be similar to value field 281, but may be customized or personalized. By way of non-limiting example, additional value fields 283 may be personalized by filtering or otherwise evaluating values in accordance with one or more suitable evaluation criteria. In general, optional additional value field(s) 283 may be filtered or otherwise evaluated in accordance with any suitable evaluation criteria. For example, it will be appreciated that particular state-action pairs may have different values for users who have different learning aptitudes (or learning styles). One user may have a greater aptitude for visual learning and another user may have a greater aptitude for interactive learning. In such an exemplary situation, state-action pairs may be assigned a first value field for users with a visual learning aptitude and a second value field for users with an interactive learning aptitude. In general, value fields 283 of state table 275 may be filtered or otherwise evaluated according to any suitable evaluation criteria. Other non-limiting examples of suitable evaluation characteristics which may be used as a basis for value fields 283 of state table 275 include: characteristics of resources (for example, evaluating video-based information resources only, evaluating interactive resources only and/or the like), characteristics of assessments (for example, evaluating assessments involving multiple choice questions only, audio assessments only and/or the like), characteristics of actions (for example, evaluating assessment only), characteristics of users (for example, grade level, learning disability, and/or the like). By way of non-limiting example, such evaluation criteria may be procured by resource interface 112, action interface 120, feedback interface 118 and/or user interface 154. By way of non-limiting example, such evaluation criteria may be procured as metadata which may be provided in the form of additional fields to one or more of resource item 200, action item 220, feedback item 230 and/or user item 240 (see FIGS. 2A-2D).

It will be appreciated that additional value fields 283 are optional. In some embodiments, a state table may comprise a plurality of value fields 283 wherein each value field is filtered or otherwise evaluated according to different evaluation criteria. In such embodiments, it is not necessary that there be an unfiltered or non-evaluated value field 281.

Figure 5A:
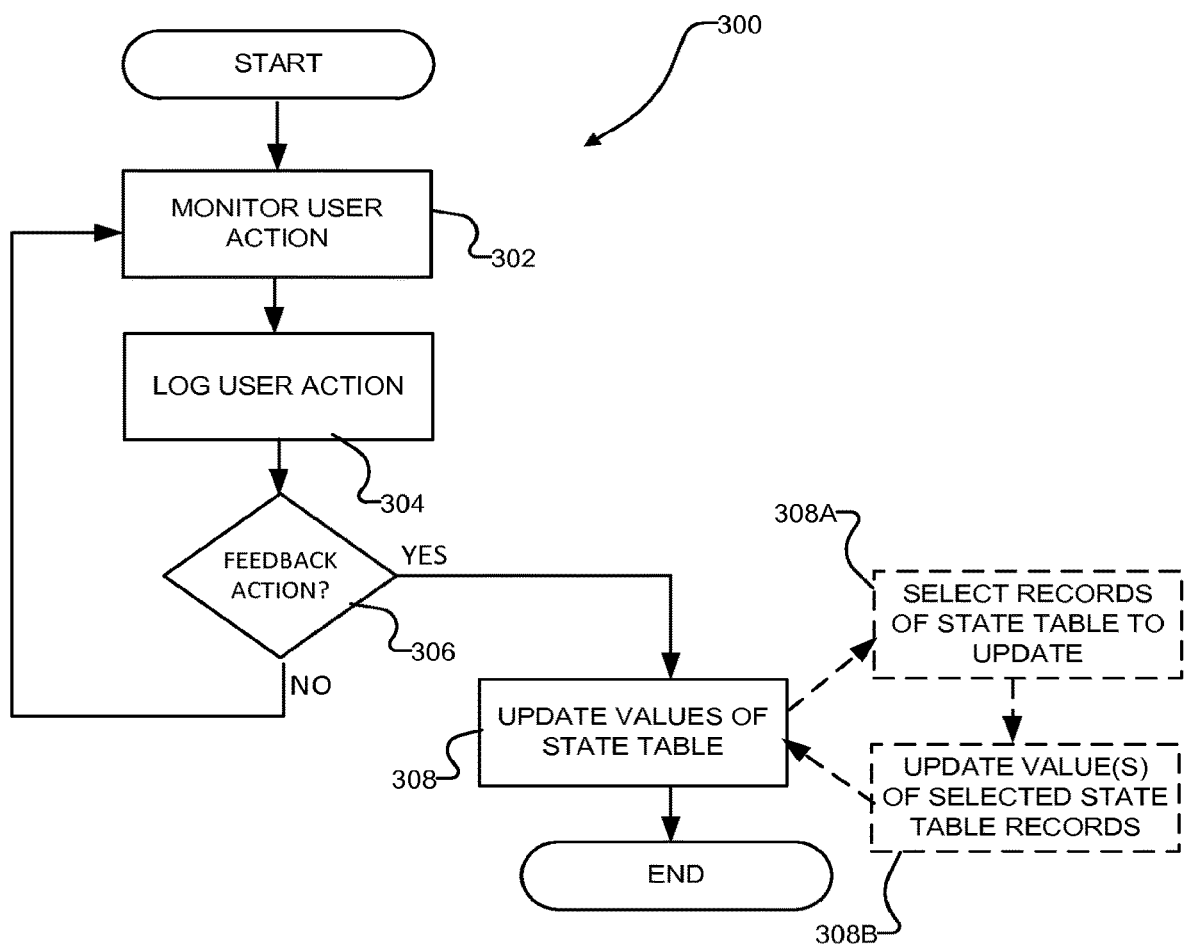
FIG. 5A illustrates a method for using reinforcement learning together with one or more feedback metrics to update values of a state table maintained by the FIG. 1 learning system according to a particular embodiment.

Ranking engine 126 may update state table 130 in response to feedback obtained from feedback interface 118 and in response to user actions which may be obtained by action interface 120. FIG. 5A illustrates a method 300 for updating state table 130 according to a particular embodiment. Method 300 commences in block 302 which involves monitoring user actions involving interaction with information resources contained in repositories 150. Whenever such an action is detected (for example by action interface 120 and/or feedback interface 118), method 300 proceeds to block 304 which involves updating a user action log. As discussed above in connection with FIG. 3A, updating a user action log may involve adding a record (e.g. a row) to the user action log to correspond with the action that has just been observed in block 302.

Method 300 then proceeds to block 306 which involves an inquiry into whether the block 302 action involves a feedback-generating action. In some embodiments, a user interacting with an assessment represents one non-limiting example of a feedback-generating action. In other embodiments, there may be additional or alternative feedback-generating actions which may be based on particular types of actions and/or corresponding types of information resources. In general, a feedback-generating action may comprise any event which comprises or otherwise provides a feedback metric. An action giving rise to any of the various forms or types of feedback described above may comprise feedback-generating actions. By way of non-limiting example, additional or alterative feedback-generating actions could include: the provision of a feedback metric by an instructor (e.g. after a user takes a verbal test with the instructor); a user interacting with a gaming subsystem (not shown) which assigns a feedback metric to the user; a user attempting to perform one or more tasks (e.g. physical tasks, assembling a widget, completing a multi-step operation) for which a feedback metric may be assigned; and/or the like. If the block 306 inquiry is negative (e.g. the logged action is something other than an assessment or some other type of feedback-generating action), then method 300 loops back to block 302.

If on the other hand the block 306 inquiry is positive, then method 300 proceeds to block 308 which involves updating the values of the state table. The block 308 process of updating values of the state table may depend on the feedback metric associated with the feedback-generating action. Assuming, for the sake of example, that the feedback-generating action evaluated in block 306 corresponds to an assessment, then the feedback metric may comprise a grade of the corresponding block 306 assessment and the block 308 process of updating the values of the state table may depend on this grade. The records of the state table that may be updated in block 308 may correspond to the state-action pairs in the user action log since the last time that the user performed a feedback-generating action and may be reflective of the path that the user took from the previous feedback-generating action to the current feedback-generating action. By way of example, considering user action log 250 of FIG. 3A, the state-action pairs in the user action log prior to taking assessment A4 include: (nu1111); (113); (1,314); (1,3,417); (1,3,4,716) and (1,3,4,7,61A4) wherein, for each state-action pair, the reference(s) on the left side of the lrepresent the state and the reference on the right hand side of the represents the action.

In currently preferred embodiments, the block 308 process of updating the state table involves the application of reinforcement learning techniques. In some embodiments, the block 308 process of updating the state table may involve the two step process of: selecting the state table records to update (as shown in optional block 308A of the illustrated embodiment); and selecting one or more new values for each selected state table record (as shown in optional block 308B of the illustrated embodiment). As discussed above, the block 308A process of selecting state table records to be updated may involve selecting the state table records with state-action pairs corresponding to the state-action pairs in the user action log since the last time that the user performed a feedback-generating action. For each of the selected state table records to be updated, the block 308B process of selecting a new value for the corresponding record may involve applying one or more value functions which depend on the previous value of the selected record and which also depend on the feedback metric of the corresponding block 306 feedback-generating action. Such value functions may permit differential weighting of different state-action pairs— for example, by weighting more recent state-action pairs relatively more heavily and by weighting more temporally distant state-action pairs relatively more lightly. In the case where a state table maintains a plurality of value fields (see value fields 283 (FIG. 4A)), the block 308B process of updating the values of the selected state table records may (but need not necessarily) be performed for each value field. The value function(s) used for each value field may be the same or may be different.

In some embodiments, updating the values of the selected state table records in block 308B involves using the state table in a model of a finite Markov Decision Process (MDP) and using a reinforcement learning technique to approximate solutions for updating the values of the selected state table records. In some embodiments, a suitable approximation technique for the value function of the model involves temporal difference (TD) reinforcement learning which may be formulated to take advantage of the so-called eligibility trace k. The eligibility trace k may be a number between [0,1] which may be used to weight the relevance of past steps (e.g. past states) to a current outcome (e.g. feedback). Where X=0, only the most recent state-action pair in the user action log would be updated based on a combination of its existing value and the new value determined by the feedback metric of the block 306 feedback-generating action. Where X=1, all of the preceding state-action pairs in the user action log would be updated based on corresponding combinations of their existing values and the new value determined by the feedback metric of the block 306 feedback-generating action. In some embodiments, the block 308 process of updating the values of the selected state table records involves application of a reinforcement learning technique known as Q-Learning. In some embodiments, the block 308 process of updating the values of the selected state table records involves application of a reinforcement learning process known as State-Action-Reward-State-Action (or SARSA) Learning. In other embodiments, a Monte Carlo method may be used in the block 308 process of updating the values of the selected state table records.

In summary, block 308B involves using the feedback metric of the block 306 feedback-generating action to update selected records of the state-table. The records updated in block 308B may be selected (in block 308A) based on the state-action pairs in the user action log since the last feedback-generating action. The updates to the values of the selected records may be determined based on a reinforcement learning technique. Also, the updates to the selected records may be individually weighted. In some embodiments, such weighting may involve the application of relatively heavy weights to records corresponding to relatively more recent state-action pairs (determined from the user action log) and relatively lighter weights to records corresponding to relatively more temporally distant state-action pairs (determined from the user action log).

Method 300 ends after the state table is updated at the conclusion of block 308.

Referring back to FIG. 1, learning system 100 of the illustrated embodiment may comprise a recommendation engine 140 which provides information in respect of recommended actions for user 142 (e.g. information resources for user 142 to interact with and/or assessments for user 142 to take). Recommendation engine 140 may base the recommended actions on one or more learning objectives. Such learning objectives may comprise or be based on one or more taxonomy items. Such learning objectives may be provided by user input (e.g. user 142 may specify a learning objective or the like through user interface 154, such as by selecting a taxonomy item, for example). Learning objectives may also be based on information from: resource classification database 114, action database 124, feedback database 122, user database 158, state table 130 and/or any other information available to system 100. Recommendation engine 140 may generally involve providing information in respect of one or more recommended actions which may help user 142 to achieve his or her learning objectives. Recommendation engine may provide this information about recommended actions via user interface 154. In some embodiments, recommendation engine 140 may provide information about an action path which may comprise a structured series of one or more recommended actions in relation to accessible information resources. Such a structured series of recommended action(s) may comprise an ordered series of recommended actions where the action path is considered by recommendation engine 140 to be an optimum path for achieving the learning objective. In currently preferred embodiments, a recommended action path culminates in a feedback-generating action, although this is not strictly necessary. In some embodiments, recommendation engine 140 may additionally or alternatively provide information in respect of a non-ordered list of one or more recommended actions in relation to accessible information resources which are considered by recommendation engine 140 to be have value in relation to the learning objective. In some embodiments, the information about recommended actions output by recommendation engine 140 may be refreshed whenever user 142 performs a feedback-generating action (e.g. completes an assessment) and/or the values of state table 130 are otherwise updated (see, for example, method 300 for updating the state table values (FIG. 5A)). In some embodiments, the information about recommended actions output by recommendation engine 140 may be refreshed after each user action in relation to the accessible information resources.

Figure 5B:
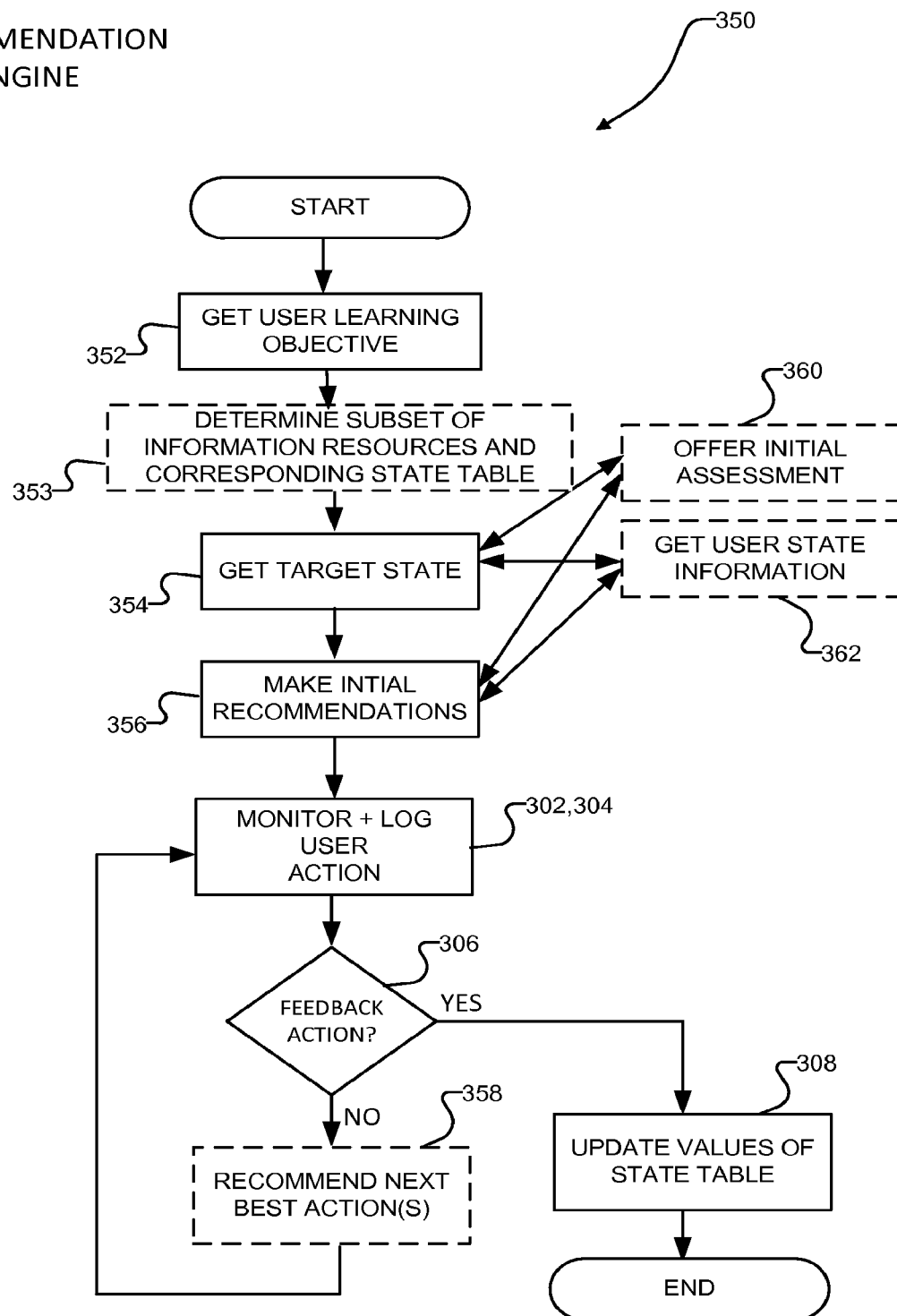
FIG. 5B is a schematic depiction of a method for providing information about recommended actions for a user of the FIG. 1 learning system according to a particular embodiment.

FIG. 5B is a schematic depiction of a method 350 for providing information about recommended actions for user 142 according to a particular embodiment. Method 350 may be referred to herein as action recommendation method 350. Method 350 commences in block 352 which involves procuring one or more user learning objectives. The block 352 user objectives may be used to limit the extent of information resources from repositories 150 under consideration during the rest of method 350. By way of non-limiting example, block 352 may involve an inquiry to user 142 via user interface 154—e.g. user 142 could be queried as to what he or she wants to learn or user 142 could be asked to select from a list and/or a taxonomy of learning topics or learning objectives. In some embodiments, a topic may be dictated for user 142 by some third party (e.g. an instructor or a curriculum setting authority) or by some other rule.

When user 142 specifies a learning objective or a learning objective is otherwise determined in block 352, this block 352 learning objective may be used in optional block 353 to narrow the extent of (or otherwise determine a subset of) information resources from repositories 150 under consideration during the rest of method 350. Such a subset may be determined based on the mapping techniques of mapping engine 116 described above. For example, the block 352 learning objective may be associated with a taxonomy item which may be considered by mapping engine 116 to be relatively closely associated with a number of information resources. As another example, the block 352 learning objective may be semantically associated with a number of key words and mapping engine 116 may compare (e.g. by suitable semantic analysis algorithm(s), such as cosine similarity and/or the like) information resources in repositories 150 to the block 352 learning objective and then subject the information resources to a thresholding process to determine a suitable subset of the information resources under consideration for the remainder of method 350.

The block 352 learning objective may be similarly used in optional block 353 to determine a subset of state table 130 which may be used for the remainder of method 350. By way of non-limiting example, method 350 may involve working with a subset of state table 130 which comprises the set of state-action pairs having either a state or an action that includes one or more of the block 353 subset of information resources determined to be relevant (e.g. by semantic analysis) to the block 352 learning objective. For the remainder of the description of method 350, it is assumed (without explicit statement) that method 350 is working with a subset of the available information resources from repositories 150 and a subset of state value table 130 as dictated by the block 352 learning objective.

Figure 5C:
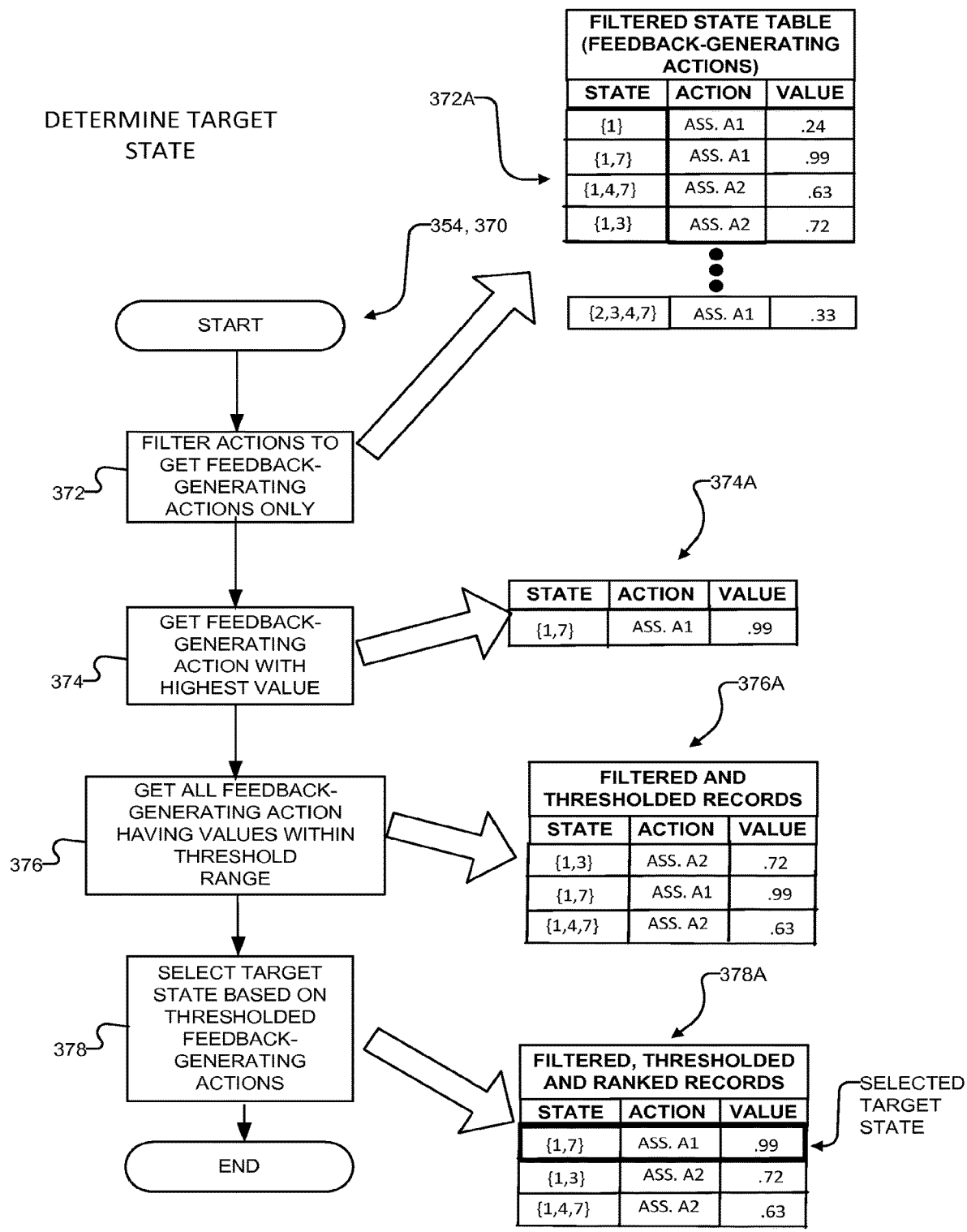
FIG. 5C schematically depicts a method for selecting a target state which may be suitable for use in the action recommendation method of FIG. 5B.

Method 350 then proceeds to block 354 which involves procuring a target state. FIG. 5C schematically depicts a method 370 for selecting a target state which may be suitable for use in block 354. Method 370 commences in block 372 which involves filtering the state table to obtain only records whose actions are feedback-generating actions (e.g. actions which result in feedback comprising a corresponding feedback metric which may result from those actions). As discussed above, one example of a feedback-generating action involves taking an assessment. Other examples of feedback-generating actions giving rise to feedback are discussed above. For the sake of brevity, this description will assume (without loss of generality) that the records of interest in method 370 are those whose feedback-generating action comprises an action of taking an assessment. Block 372 then involves filtering the state table to obtain only records whose actions are "take assessment". FIG. 5C shows a non-limiting example of a filtered state table 372A which may be the result of the block 372 filtering procedure. It may be seen that the exemplary illustrated filtered state table 372A only includes records for which the associated actions correspond to assessments.

Method 370 then proceeds to block 374 which involves selecting the record with the highest value from among the block 372 filtered state table records (e.g. filtered state table 372A). As discussed above, a record of the state table may have more than one value field. For the sake of brevity, this description will assume (without loss of generality) that there is only one value field in action recommendation method 350 (FIG. 5B). It will be appreciated that the methods described herein could be extended to relate to one or more additional value fields. As described in more detail below, the use of such additional value fields may be used to personalize the recommendations of action recommendation method 350. It will be appreciated from the discussion of updating the values of the state table records in method 300 (FIG. 5A) above, that the block 374 record having the highest value from among the block 372 filtered records corresponds to a state and an action considered by system 100 to have relatively high value based on assessment feedback from the users of learning system 100 (which may include the particular user that is the subject of action recommendation method 350 (FIG. 5B) and other users of system 100). In the case of the exemplary filtered state table 372A, the record returned by the block 374 procedure is shown as record 374A. It will be observed that record 374A corresponds to the record having the highest value in exemplary filtered state table 372A.

Once the highest-value filtered (feedback-generating) record is ascertained in block 374, method 376 proceeds to block 376. Block 376 involves procuring all of the block 372 filtered state table records which have values within a threshold range of the block 374 highest value state table record. In the case of example filtered state table 372A, method 376 involves procuring all of the records having values within a threshold range of the value of record 374A. The particular threshold used in block 376 may be a configurable (e.g. user configurable or system configurable) parameter of learning system 100. FIG. 5C shows a set of filtered and thresholded records 376A corresponding to a value threshold of 0.40 from the highest-value record 374A. In this exemplary case, the value of highest-value record is 0.99 and the threshold is 0.40, so only records having values greater than 0.99−0.40=0.59 or greater are admitted into the set of filtered and thresholded records 376A.

In other embodiments, the block 376 thresholding process may comprise selecting a threshold number of records. For example, the filtered state table records may be ranked according to value and then block 376 may involve taking a threshold number (e.g. 10) of the highest value-ranked records. In still other embodiments, the block 376 thresholding process may comprise selecting a threshold fraction of the block 372 filtered state table records. For example, the filtered state table records may be ranked according to value and then block 376 may involve taking a threshold fraction (e.g. ¼) of the highest value-ranked records. In some embodiments, the block 376 thresholding process may involve the use of values in one or more optional value fields 283 (see FIG. 4A) of the state table records. For example, the filtered state table records may be ranked according to value and then block 376 may involve taking the highest value-ranked records which have at least a threshold value level (e.g. greater than 0.5) in an optional value field. In other embodiments, criteria other than values may be used as the basis for the block 376 thresholding. By way of non-limiting example, such other criteria could include statistical criteria (e.g. standard deviation of values, percentiles of values), number of updates (e.g. block 308 updates) to the values and/or the like.

Method 370 then proceeds to block 378 which involves selecting a target state or target record (based on the block 376 filtered and thresholded records) to be returned as the output of method 370 (block 354—FIG. 5B). There are a number of techniques which are envisioned that may be suitable for the block 378 process of selecting a target state based on the block 376 filtered and thresholded records. In some embodiments, block 378 involves selecting a target state from among the block 376 records. In one particular embodiment, block 378 involves selecting the block 376 record with the smallest state size (i.e. the smallest number of actions in the corresponding state) to be the selected target state. In the case of the exemplary records shown in FIG. 5C, it can be seen that the set of records 378A includes a plurality of records that each have a state size of two (i.e. two actions in the corresponding state). In the case of such a tie among the smallest state size records, block 378 may return the state corresponding to the record with the highest value as the block 354 selected target state. Accordingly, in the exemplary case shown in FIG. 5C, block 378 returns the state {1,7} as the target state of method 370 (block 354—FIG. 5B).

In other embodiments, other techniques may be used to select the target state from among the block 376 filtered and value-thresholded records. For example, in one particular embodiment, block 378 involves selecting a median state size record from among the block 376 records. In another non-limiting example embodiment, block 378 involves randomly selecting a record from among the block 376 filtered and value-thresholded records. The block 376 records may be used as a basis for selecting the block 378 record without necessarily selecting the target state from among the block 376 records. In another non-limiting example embodiment, block 378 may involve selecting a target state based on the most frequently occurring actions in the block 376 records. Such a target state may be created if it is not already present among the block 376 records. For example, a target state may be created (or selected) to include actions that occur more than a threshold number of times (e.g. 10 times) among the states of the block 376 records. As another example, such a target state may be created (or selected) to include a threshold number (e.g. 10) of the top most frequently occurring actions from among states of the block 376 records. As yet another example, such a target state may be created (or selected) to include a threshold fraction of the most frequently occurring actions from among the states of the block 376 records. It will be appreciated that any suitable technique(s) may be used for selecting (or creating) the target state in block 378 and that such a technique may be based on information from the block 376 records.

Ultimately, method 370 (FIG. 5C) returns a target state which may be used in block 354 of action recommendation method 350 (FIG. 5B).

Returning to method 350 (FIG. 5B), in some embodiments, the block 354 procedure for procuring a target state may be personalized by the optional steps of offering a diagnostic assessment in block 360 and/or procuring information in respect of the user's current state. These optional procedures are described in more detail below. At the conclusion of block 354, method 350 has determined a target state. The block 354 target state comprises the state field of a record which has a feedback-generating action (e.g. an assessment action). The block 354 target state may have a relatively high value field (e.g. indicating that the actions in this state will help to achieve the user's block 352 learning objective). The block 354 target state may also have a relatively small state size (i.e. a state with a relatively small number of action entries). As discussed above, the block 354 target state may be selected based on its value field which may be in turn based on feedback information obtained from the users of system 100 (for which feedback information is incorporated into the state table).

After block 354, method 350 proceeds to block 356 which involves making initial action recommendations for user 142. Block 356 may be performed by recommendation engine 140 (FIG. 1). The block 356 initial recommendations may generally comprise one or more recommended actions which may help user 142 to achiever his or her block 352 learning objectives. The block 356 recommended actions may, but need not necessarily, be based on the block 354 target state. In one non-limiting embodiment, the block 356 initial recommendation may involve recommending some or all of the actions in the block 354 target state. Such actions may be recommended in any order or in some desired order. In some embodiments, block 356 involves additionally or alternatively recommending a relatively structured set of actions which may be referred to herein as an action path or, more succinctly, a path. An action path recommended as a part of block 356 may involve an ordered series of one or more actions in relation to accessible information resources which is considered by system 100 to be an optimum path for achieving the block 352 learning objective. In currently preferred embodiments, a recommended action path culminates in a feedback-generating action, although this is not strictly necessary. In some embodiments, block 356 may additionally or alternatively recommend a non-ordered list of one or more actions in relation to accessible information resources which are considered by system 100 to be have value in relation to the block 352 learning objective.

Figure 5D:
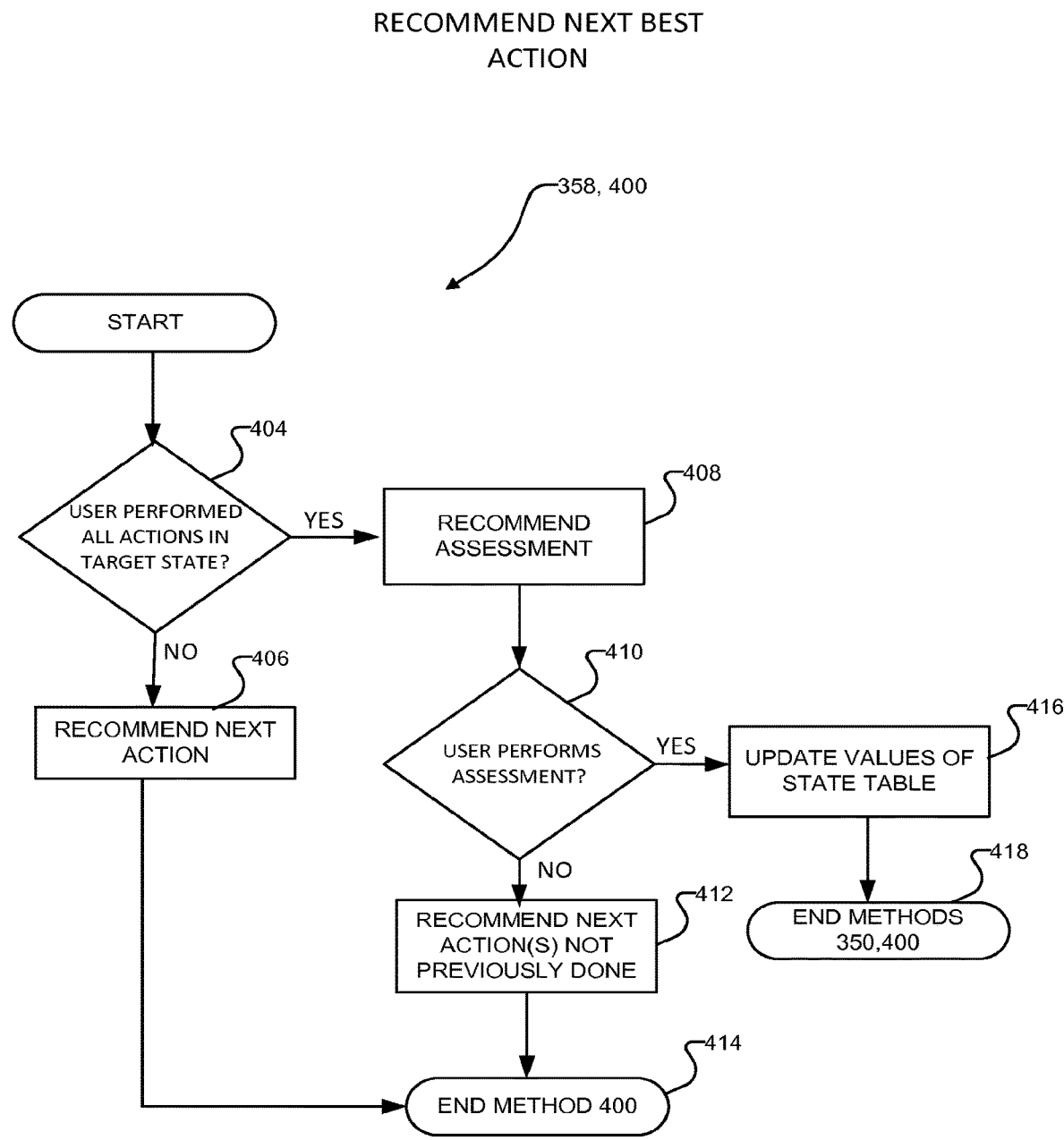
FIG. 5D schematically depicts an optional method for determining a next best action or actions for a user after just having completed an action according to a particular embodiment.
Figure 5E:
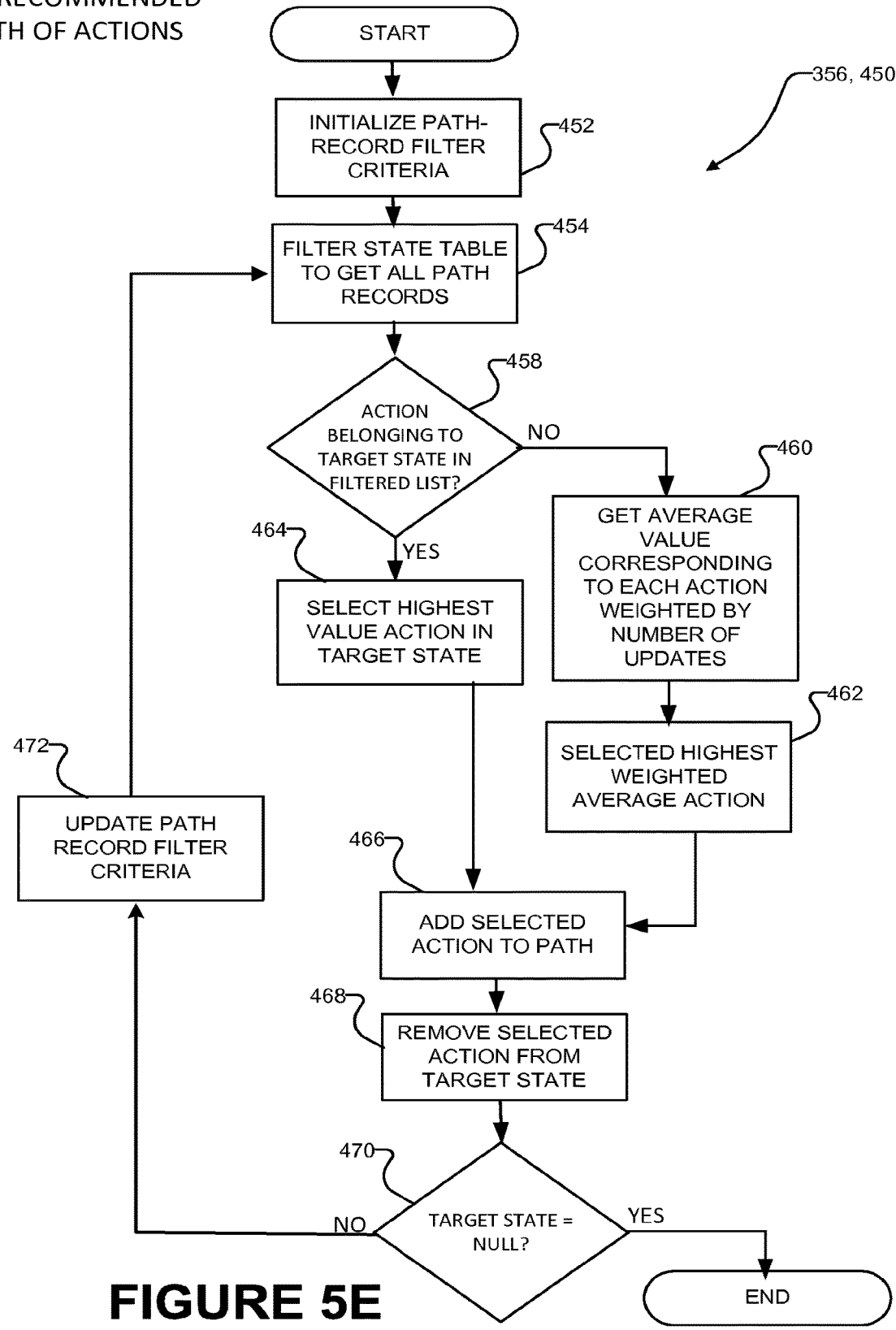
FIG. 5E schematically depicts a method for providing information about a path comprising a structure (e.g. ordered) series of recommended actions which may be suitable for use in the action recommendation method of FIG. 5B according to a particular embodiment.

FIG. 5E schematically depicts a method 450 for providing information about an action path comprising an ordered series of recommended actions which may be suitable for use in block 356 according to a particular embodiment. Method 450 commences in block 452 which involves initializing a filter criteria for path records. In the first loop of method 450, the filtering criteria for path records may be set to state={null}. That is, after the block 452 initialization, a record in the state table may be considered to be a path-record if its state corresponds to state={null}. The case where the block 452 path record filter criteria are set to state={null} assumes that either the user's historical state information is not being considered in method 450 or that the user's historical state information is {null}—e.g. system 100 has no record or log of past actions of this user.

In some circumstances or embodiments, system 100 may know information about a user's current state (e.g. about the user's history of actions)—see the example user action log of FIG. 3A. In such circumstances or embodiments, the block 452 path-record filter criteria may be personalized to the particular user by incorporating the user's current state information. Such personalization of the block 452 path-record filter criteria may lead to correspondingly personalized recommended action path output from method 450. For example, the block 452 initial path-record filter may be based on the user's current state. For example, if the user's current state is {1,5,6,8} (indicating that the user had interacted with resource information items having resource IDs=1,5,6 and 8), then block 452 may involve setting the initial path-record filter criteria to state={1,5,6,8}. Method 350 shows that user state information may optionally be acquired in block 362 (see FIG. 5B).

After initializing the path-record filter criteria in block 452, method 450 proceeds to block 454 which involves filtering the state table to get a filtered set of records corresponding only to path records. In the first iteration, block 454 involves procuring a set of path records whose states are equal to those of the block 452 initial path-record filter criteria. For example, if the block 452 path-record filter criteria are set to state={null}, then block 454 may return a set of path records, whose states are all state={null}.

Method 450 then proceeds to block 458 which involves an inquiry into whether any of the block 454 set of path records have corresponding actions that are in the block 354 target state (see FIG. 5B). As discussed above, the block 354 target state comprises one or more action entries. If any of these action entries of the block 354 target state correspond to the action field of the block 454 set of path records, then the block 458 inquiry is positive. Otherwise, the block 458 inquiry is negative. Taking first the block 458 YES output, method 450 proceeds to block 464 which involves selecting the record with the highest value from among the records having an action entry in the target state and selecting the action of that record to be the next recommended action in the path.

If the block 458 inquiry is negative (i.e. there are no block 454 path records having action entries among the actions of the block 354 target state), then method 450 proceeds to block 460. Block 460 involves setting aside the block 454 set of path records and generating a weighted average of the values for the state table records (within the block 353 subset) having an action in the block 354 target state. For example, consider the exemplary case discussed above where the block 354 target state is {1,7}. Block 460 may involve computing a weighted average of the values of the records having an action=1 and a weighted average of the values of the records having an action=7. The averages computed for each action in block 460 may be weighted by the relative number of times that the value of the corresponding record has been updated (e.g. updated in block 308 (FIG. 5A)). For each action, this weighted average may be determined according to the formula:

$$\text{weighted\_average\_action} = \sum_{SA} \frac{\text{record\_value} \cdot \text{\#updates\_for\_record}}{\text{total\_\#\_updates\_for\_}SA}$$

where:

SA is the set of all records corresponding to the action (from among the block 353 subset);

record_value is the value in the value field of a corresponding record;

updates_for_record is the number of times that the value for a particular record has been updated in block 308 (FIG. 5A); and total_#_updates for_SA is the number of times that the values of all records in the set SA have been updated in block 308 (FIG. 5A).

Consider the following example, where the target state is {1,7}, the records having action values=1 are given by:

| State | Action | Value | # updates for record |
|---|---|---|---|
| {2, 3} | 1 | 0.3 | 10 |
| {4, 6} | 1 | .7 | 15 |
| {4, 8, 9} | 1 | 0.5 | 1 | and the records having action values=7 are given by:

| State | Action | Value | # updates for record |
|-------|--------|-------|----------------------|
| {1, 3} | 7 | 0.4 | 7 |
| {6, 7} | 7 | 0.5 | 33 |
| {4, 2, 9} | 7 | 0.8 | 12 |

In this exemplary case, the weighted average for action 1 is given by:

$$\text{weighted\_average\_action\#1} = \frac{0.3 \cdot 10}{26} + \frac{0.7 \cdot 15}{26} + \frac{0.5 \cdot 1}{26} = 0.5385$$

and the weighted average for action 7 is given by:

$$\text{weighted\_average\_action\#7} = \frac{0.4 \cdot 7}{52} + \frac{0.5 \cdot 33}{52} + \frac{0.8 \cdot 12}{52} = 0.5558$$

Once the weighted averages are calculated in block 460, method 450 proceeds to block 462 which involves selecting the action corresponding to the highest block 460 weighted average to be the next recommended action. In the case of the illustrative example set out above, block 462 would involve selecting action=7 (i.e. interact with resource ID=7) to be the next recommended action, since the weighted average for action=7 is greater than the weighted average for action=1.

Whether through block 464 or through blocks 460 and 462, method 450 eventually ends up in block 466 with a selected action to be the next recommended action in the recommended path. Block 466 involves adding the selected action (from block 464 or 462) to be the next action in the recommended path. Method 450 then proceeds to block 468 which involves temporarily removing the selected action (from block 464 or block 462) from the target state for the remainder of method 450. Method 450 then proceeds to block 470 which involves an inquiry into whether the target state has been emptied of all actions (e.g. whether the target state is empty after having its last action removed in block 468). If the block 470 inquiry is positive, then method 450 ends. Otherwise method 450 loops back to block 454 via block 472.

Block 472 involves updating the path record filter criteria to reflect the fact that the selected action has been added to the recommended action path in block 466. This may involve adding the block 466 action to the path-record filter criteria. For example, as discussed above, in the first iteration the path record filter criteria may be set to {null} in block 452 in circumstances where it is desirable to recommend the best action for a user, given the assumption that system the user has no historical state. However, when an action is selected in block 466, it is then assumed that the user will perform the selected action and that the next recommended action should take into account that the user will have performed the first recommended action. To effect this, block 472 involves adding the block 466 selected action to the path-record filter criteria.

At its conclusion, method 450 has developed an action path comprising an ordered list of actions that may be used as the initial recommended actions in block 356 of action recommendation method 350 (FIG. 5B).

Figure 5F:
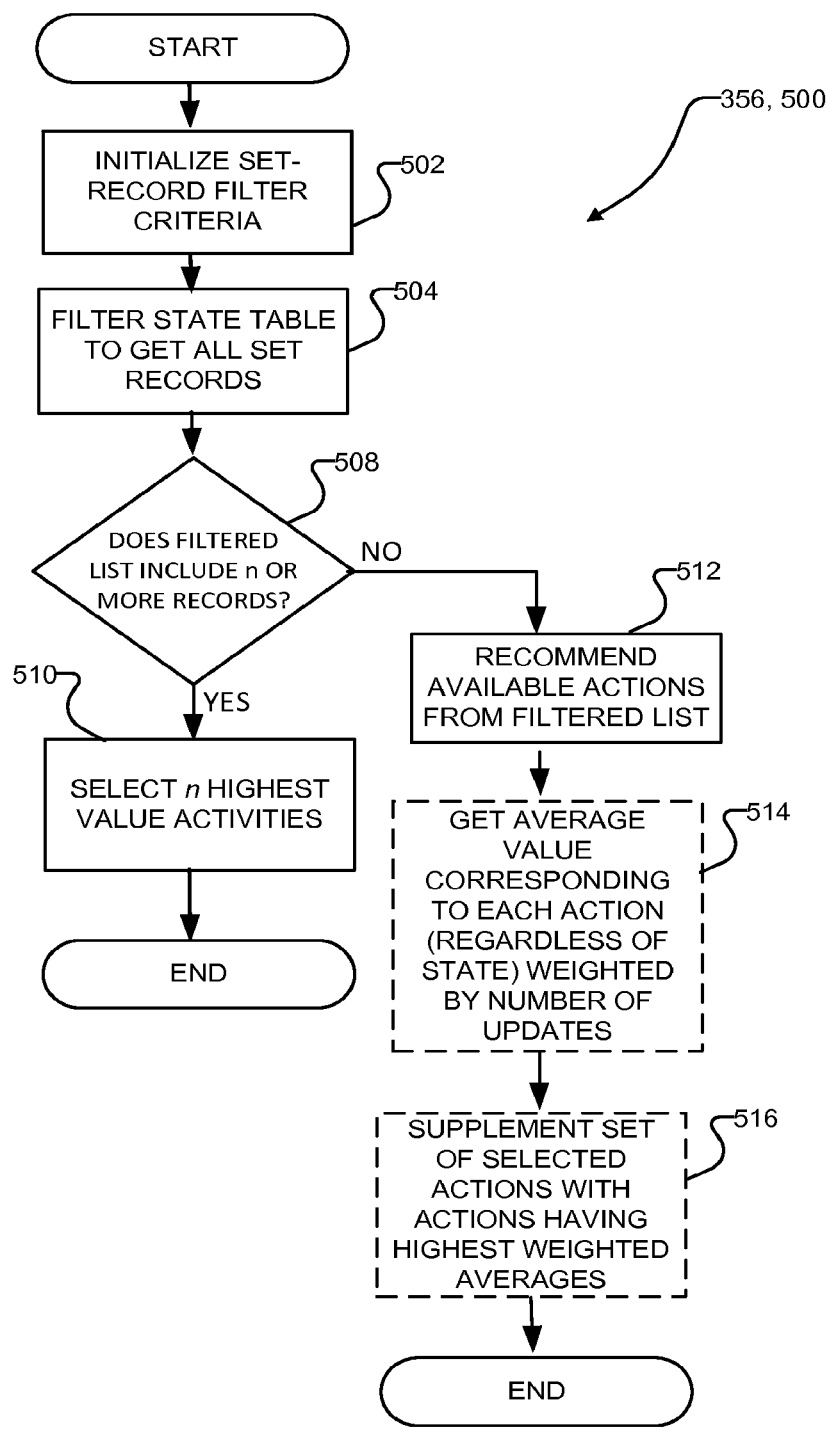
FIG. 5F schematically depicts a method for providing information about a set of one or more recommended actions which may be suitable for use in the action recommendation method of FIG. 5B according to a particular embodiment.

As discussed above, other additional or alternative techniques may be used to obtain the initial recommendations in block 356. By way of non-limiting example, in some embodiments, block 356 may additionally or alternatively involve recommending a non-ordered set of one or more actions in relation to accessible information resources which are considered by system 100 to be have value in relation to the block 352 learning objective. FIG. 5F schematically depicts a method 500 for providing information about a set of n recommended actions which may be suitable for use in block 356 according to a particular embodiment. Method 500 commences in block 502 which involves initializing a filter criteria for set-records. In one particular embodiment, the block 502 process of initializing filter criteria for set records may be similar to the block 452 process of initializing filter criteria for path records. In some embodiments, the filtering criteria for set records may initially be set to state={null}. That is, after the block 502 initialization, a record in the state table may be considered to be a set-record if its state corresponds to state={null}.

The case where the block 502 set-record filter criteria are set to state={null} assumes that either the user's historical state information is not being considered in method 500 or that the user's historical state information is {null}—e.g. system 100 has no record or log of past actions of this user. In some circumstances or embodiments, system 100 may know information about a user's current state (e.g. about the user's history of actions)—see the example user action log of FIG. 3A. In such circumstances or embodiments, the block 502 set-record filter criteria may be personalized to the particular user by incorporating the user's current state information. Such personalization of the block 502 path-record filter criteria may lead to a correspondingly personalized set of recommended actions output from method 500. For example, the block 502 initial set-record filter may be based on the user's current state. For example, if the user's current state is {1,5,6,8} (indicating that the user had interacted with resource information items having resource IDs=1,5,6 and 8), then block 502 may involve setting the initial set-record filter criteria to state={1,5,6,8}. Method 350 shows that user state information may optionally be acquired in block 362 (see FIG. 5B).

After initializing the set-record filter criteria in block 502, method 500 proceeds to block 504 which involves filtering the state table to get a filtered list of records corresponding only to set records i.e. corresponding to records whose states are the same as those of the block 502 set-record filter criteria. Continuing with the previous example, if the block 502 set-record filter criteria are set to state={1,5,6,8}, then block 504 may return a list of set records, whose states are all state={1,5,6,8}.

Method 500 then proceeds to block 508 which involves an inquiry into whether the block 504 filtered list includes the desired number n of records. The desired number n of records which are recommended in accordance with method 500 (FIG. 5F) may be a user-configurable or system parameter which may generally comprise any positive integer number (e.g. one or more). In some embodiments, it is desirable that the number n of recommended actions be a plurality of actions, but this is not necessary. If the block 504 filtered list does include the desired number n of records, then method 500 proceeds to block 510. In the illustrated embodiment, block 510 involves selecting the n highest valued records to be the n recommended actions output from method 500. On the other hand, if the block 504 filtered list does not include the desired number n of records, then method 500 proceeds to blocks 512. In the illustrated embodiment, block 512 involves recommending the actions from among available records of the block 504 filtered list.

For example, if number of actions n to be recommended by method 500 is n=5 and the number of available records from the block 504 filtered list is 3, then block 512 involves recommending the actions corresponding to the 3 available records from the block 504 filtered list.

From block 512, method 500 proceeds to optional blocks 514 and 516 which involve optionally supplementing the block 512 actions with a number of other actions to reach the desired number n of recommended actions. In one particular embodiment, block 514 involves determining a weighted average of the values of the records for each action regardless of the states of those records, wherein the attributed weight is based on the relative number of times that the value of the corresponding record has been updated (e.g. updated in block 308 (FIG. 5A)). Such a weighted averaging process could be similar to that described above for block 460 of method 450. After determining these weighted averages, method 500 proceeds to block 516 which involves supplementing the block 512 recommended actions with the block 514 actions having the highest weighted-average values. Continuing with the previous example, if n=5 and block 512 involves recommending 3 actions, then block 516 may involve recommending the 2 actions with the highest block 514 weighted averages.

At its conclusion, whether through block 510 or block 516, method 500 generates a set of n recommended actions which may be used for the initial action recommendations in block 356 of action recommendation method 350 (FIG. 5B). The set of n recommended actions generated in accordance with method 500 could comprise an addition to or an alternative to any other block 356 initial action recommendations (e.g. a path recommended in accordance with method 450 (FIG. 5E)).

Returning now to method 350 (FIG. 5B), block 356 ends with the recommendation of an initial set of one or more actions for user 142 to perform which are considered by learning system 100 to be helpful in permitting user 142 to achieve her block 352 learning objective. While user 142 may be forced to perform the block 356 recommended actions in some embodiments, in other embodiments this is not necessary and user 142 may be permitted to perform any action that they want. Method 350 (FIG. 5B) may monitor and log user action in block 302, 304. The monitoring and logging in block 302, 304 of method 350 may be similar to that described above in blocks 302, 304 of method 300 (FIG. 5A). The block 306 inquiry of method 350 into whether the user's current action is a feedback-generating action may be substantially similar to the above-described block 306 inquiry of method 300. Along the block 306 YES branch, the block 308 procedure of updating state table values of method 350 may be substantially similar to the above-described block 308 procedure of method 300.

Along the block 306 NO branch, however, method 350 differs from method 300 in that method 350 comprises an optional block 358. Block 358 involves recommending the next best one or more actions for user 142 given that the user has just completed an action that was monitored and logged in blocks 302, 304. FIG. 5D schematically depicts a method 400 which may be suitable for use in the optional block 358 process of determining a next best one or more actions for user 142 given their updated state after just having completed an action according to a particular embodiment. Method 400 commences in block 404 which involves an inquiry into the updated state of the user from the user action log and as to whether the user has completed all of the actions in the block 354 target state.

If the block 404 inquiry is negative (i.e. there are still actions in the block 354 target state that the user has not performed), then method 400 proceeds to block 406. Block 406 involves recommending one or more next actions based on the updated user state. In one particular embodiment, block 406 may involve recommending all of the actions in a target state that are not already part of the user's updated state. In some embodiments, block 406 may additionally or alternatively involve a re-application of method 450 (FIG. 5E) using the user's updated state for the block 452 initial path-record filter criteria so as to obtain an updated path comprising an ordered series of one or more recommended actions. In some embodiments, block 406 may additionally or alternatively involve a re-application of method 500 (FIG. 5F) using the user's updated state as the block 502 initial set-record filter criteria. After updating the recommended actions in block 406, method 400 ends in block 414.

If the block 404 inquiry is positive (i.e. the user has performed all of the actions in the block 354 target state), then method 400 proceeds to block 408 which involves recommending that the user take an assessment. Block 410 then involves an inquiry as to whether the user does in fact take the assessment recommended in block 408. If the user does not take the assessment recommended in block 408 (block 410 NO output), then method 400 proceeds to block 412. Block 412 involves recommending one or more actions that the user has not already performed. The block 412 recommended actions may involve performing a weighted averaging technique and then selecting the action or actions with the highest weighted average values in a manner similar to blocks 460, 462 (and blocks 514, 516) described above, except that rather than performing the weighted average over the actions in the target state, the block 412 weighted averaging technique may be performed over any actions that the user has not already performed. One or more actions may be selected in block 412 on the basis of those actions with the highest weighted average values. Block 412 may conclude with the recommendation of one or more action(s) that the user has not already done (i.e. one or more actions that are not part of the user's state). After the determining the block 412 recommended action(s), method 400 ends in block 414.

If method 400 ends in block 414 (either because of recommended actions originating from block 406 or from block 412), then block 358 (FIG. 5B) returns an updated list of action recommendation(s) prior to looping back to blocks 302, 304.

Returning to the block 410 inquiry, if the user does perform the recommended assessment (block YES output), then method 400 advances to block 416 which involves updating the values of the state table based on the feedback metric associated with the assessment. Block 416 may be substantially similar to block 308 of method 300 (FIG. 5A) and block 308 of method 350 (FIG. 5B). If the values of the state table are updated in block 416, then method 400 ends in block 418, which also involves ending method 350 (FIG. 5B).

Figure 5G:
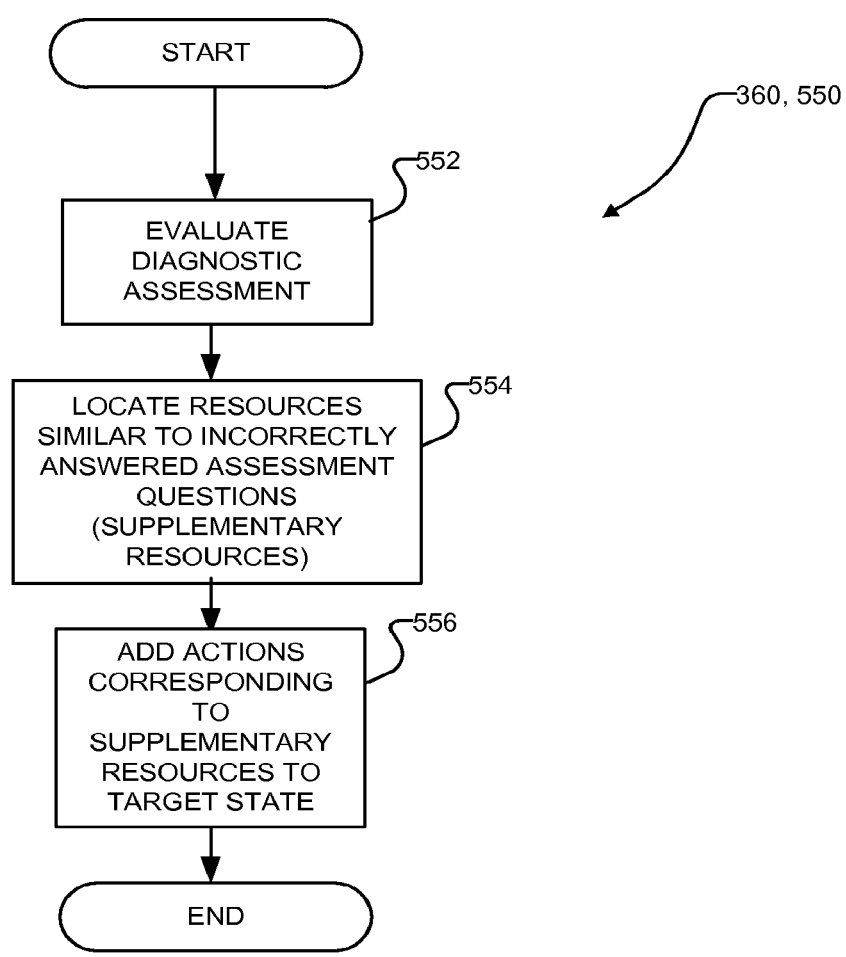
FIG. 5G schematically illustrates one method for using a diagnostic assessment which may be suitable for use in the action recommendation method of FIG. 5B according to a particular embodiment.

As discussed above, method 350 (FIG. 5B) includes optional blocks 360 and 362 which may be used to influence the target state procured in block 354 and/or the initial recommendations generated in block 356. The use of user state information (optional block 362) to influence initial path-recording filter criteria (in block 452) and/or initial set-record filter criteria (in block 502) is discussed above. Optional block 360 involves having user 142 perform a pre-test (or diagnostic assessment) to test the user's initial level of understanding of a particular topic or learning objective. Such a block 360 diagnostic assessment may be used in a variety of manners. FIG. 5G schematically illustrates one method 550 for using the diagnostic assessment which may be suitable for use in block 360 according to a particular embodiment.

Method 550 commences in block 552 which involves evaluating or otherwise obtaining an evaluation of the diagnostic assessment performed by the user e.g. to determine the correct answers and the incorrect answers provided by the user. In some embodiments, such an evaluation is performed by an external entity (e.g. LMS 150C, an instructor and/or the like), but the results of the evaluation are provided to learning system 100 (e.g. through resource interaction activity records 156, through assessment manager 128 and/or the like). Method 550 then proceeds to block 554 which involves locating supplementary information resources. The block 550 supplementary resources may be similar to the incorrectly answered diagnostic assessment questions. For example, the incorrectly answered questions could be submitted to mapping engine 116 for semantic analysis and the block 550 supplementary content may be determined by mapping engine 116 to be semantically similar to the incorrectly answered questions. As discussed above, there are a wide variety of suitable metrics (e.g. cosine similarity and/or the like) for assessing semantic proximity.

After determining supplementary content items in block 554, method 550 proceeds to block 556 which involves adding actions corresponding to the supplementary content to the target state to obtain an expanded target state. The block 556 expanded target state may then be output as the block 354 target state and may be used for the balance of method 350. Additionally or alternatively, block 556 may involve adding supplementary actions to the recommended actions in block 356 and/or block 358. Such supplementary actions may comprise actions which involve interaction with the block 554 supplementary resources.

Learning system 100 can provide personalized recommendations of actions for a particular user 142 or for groups of particular users who share one or more common characteristics. One technique for providing personalized action recommendations involves the use of the user's current state, which is reflective of the history of actions of that user in relation to accessible information resources. By way of non-limiting example, the user's current state may be used by learning system 100 in some embodiments to personalize the recommendation blocks (356 and 358) of method 350 (FIG. 5B) and more particularly in connection with the illustrated embodiments of recommendation procedures 400 (FIG. 5D), 450 (FIG. 5E) and 500 (FIG. 5F). Each of these exemplary embodiments of methods for recommending actions may personalize recommended actions by taking into account the user's current state (or action history) when making recommendations. By way of non-limiting example, the illustrated example action path recommendation method 450 of FIG. 5E (which may be used in block 356 and/or block 358 of method 350 (FIG. 5B) and in block 406 of method 400 (FIG. 5D)) may use the user's current state as the initial path-record filter criteria (in block 452). In this manner, the action path recommended by action path recommendation method 450 may be personalized for a particular user based on the user's history of interaction with accessible information resources. Similarly, the illustrated example method 500 of FIG. 5F for recommending a set of n actions (which may be used in block 356 and/or block 358 of method 350 (FIG. 5B) and in block 406 of method 400 (FIG. 5D)) may use the user's current state as the initial set-record filter criteria (in block 502). In this manner, the set of n actions recommended by action recommendation method 500 may be personalized for a particular user based on the user's history of interaction with accessible information resources.

Another technique which may be used by learning system 100 to personalize recommendations for a particular user involves the use of a diagnostic assessment. Such a diagnostic assessment is shown in optional block 360 of action recommendation method 350 (FIG. 5B) and may be used to obtain the target state for the particular user (in block 354) and/or the initial recommendations (in block 356). FIG. 5G shows an example of a method 550 which may be suitable for incorporating the results of a diagnostic assessment into the block 354 target state and/or the block 356 recommendations. Although not explicitly shown in the FIG. 5B illustrated embodiment, the diagnostic assessment may also be used in a similar manner to make updated recommendations in block 358. As discussed above, the questions that a particular user answers incorrectly may be used to determine supplemental resources. Such supplemental resources may be added to the target state for the particular user (which may indirectly influence the recommended actions for the particular user) and/or such supplemental resources can be incorporated directly into recommended actions for the particular user. In this manner, the recommended actions are personalized for a particular user based on the diagnostic assessment taken by the user.

Another technique which may be used by learning system 100 to personalize recommendations for a particular user involves the use of additional value fields 283 (see additional value fields 283 of the FIG. 4A example state table). As discussed above, such additional value fields may be filtered or otherwise evaluated according to a variety of characteristics, including, by way of non-limiting example, according to: a particular user; one or more particular user characteristics (e.g. user profile characteristics, such as language, country, sex, age, personal preferences, physical abilities, psychological abilities, intellectual abilities); characteristics of information resources (for example, video-based information resources only, interactive resources only, resources available from particular repository only and/or the like), characteristics of assessments (for example, assessments involving multiple choice questions only, audio assessments only, assessments set by certain curriculum setting authorities only and/or the like), characteristics of actions (for example, by assessment only), other characteristics (for example, policies of some schools, policies of some jurisdictions (e.g. school jurisdictions, states and/or countries) and/or the like.

As described above, state table 130 maintained by system 100 (e.g. by ranking engine 126) ascribes value to particular state-action pairs whenever feedback (comprising a feedback metric) is obtained by feedback interface 118. As discussed above and as shown in the exemplary FIG. 4A state table275, the state table maintained by system 100 may comprise a plurality of value fields, which may include additional value fields 283. Such additional value fields may be used to maintain values filtered or otherwise evaluated according to any of the evaluation criteria mentioned above or according to any other suitable evaluation criteria. By way of non-limiting example, consider the case of a user characteristic of being dyslexic. An additional value field may be maintained in the state table for users who have the characteristic of dyslexia. Feedback events may then be filtered or otherwise evaluated, such that the values of this additional value field are updated only in response to feedback involving users who share this characteristic (e.g. dyslexic users). Then, if desired, action recommendations can be personalized for users who share this characteristic (e.g. dyslexic users) by using the additional value field (in the place of, or in combination with, the general value field (or any other suitable value field)) in the action recommendation methods described above. In this manner, the actions recommended by system 100 can be personalized for users who share this characteristic.

In general, any user characteristic may be used as an evaluation criteria for an additional value field. Non-limiting examples of user characteristics which may be used as evaluation criteria for additional value fields, include: grade level of the user; age of the user; sex of the user; preferred learning style or aptitude of the user; preferred information resource types (e.g. video, graphic, textual, interactive, etc.) of the user; physical disabilities of the user (e.g. blindness, deafness, ability to move the hands, etc.); learning disabilities of the user; and/or the like. Such evaluation criteria may be configurable parameters of system 100. In some embodiments, such evaluation criteria may be user-configurable. As discussed above, criteria which may be used as evaluation criteria for additional value fields are not limited to user characteristics and may include some of the other criteria mentioned above. By way of non-limiting example, the same state-action pairs may have different values in Bosnia as they do in North America and such different values may be managed using separate value fields for the same state action pairs.

Embodiments of the present invention include various operations, which are described herein. Unless otherwise specified, these operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (for example, software, processing application) readable by a machine (for example, a computer). The machine-readable medium may include, but is not limited to, magnetic storage medium (for example, floppy diskette); optical storage medium (for example, CD-ROM); magneto-optical storage medium; read-only memory (ROM); random-access memory (RAM); erasable programmable memory (for example, EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems. Methods indicated as a single series of process steps may have one or more subsets of the steps executed on a corresponding one or more computer processors that then communicate interim results or the availability of results among the computer processors using interprocess communication, for example. Data values may be stored in cache memory residing in proximity to the CPU or by addressing computer main memory through memory management hardware or even by such memory management hardware causing data to be stored on an external storage device to be loaded into computer main memory.

Computer processing components used in implementation of various embodiments of the invention include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In particular embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (for example, a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

In the learning system embodiments described herein, the learning system makes feedback-driven action recommendations for a particular user which may be based on feedback from the users of the learning system (including the particular user and/or other users of the learning system). In other embodiments, the methods described herein can be adapted for other purposes. In some embodiments, the invention comprises methods and systems for feedback-driven provision of information. One particular type of information provision comprises providing information in respect of recommended actions for interacting with information resources (e.g. educational information resources). In other embodiments, however, other types of information could be provided. Non-limiting examples of types of information that could be provided with suitable modification to the methods and systems described herein include: information about history (logs) of online activity; information about physical activity results (athletes program training, series of results, scores, etc.); information in respect of any other types of resources that can be engaged with through an action; and/or the like.

One particular type of feedback capable of providing a feedback metric is an assessment (e.g. an educational assessment) which can provide a grade. In other embodiments, however, feedback metrics could be provided via other types of feedback. Non-limiting examples of other types of feedback that could be provided include: the provision of a feedback metric by an instructor (e.g. after a user takes a verbal test with the instructor); a user interacting with a gaming subsystem (not shown) which assigns a feedback metric to the user; a user attempting to perform one or more tasks (e.g. physical tasks, assembling a widget, completing a multi-step operation) for which a feedback metric may be assigned; financial results of action(s) which may provide any of a host of suitable financial feedback metrics; audience reaction to an event (which may provide feedback metrics such as ticket sales or loudness of cheering, for example) and/or the like.

One particular type of user action that could be monitored is user interaction with information resources (e.g. educational information resources). In other embodiments, however, other types of user actions could be monitored. Non-limiting examples of other types of actions which could be monitored include: a series of one or more physical movements (e.g. in the context of sports or other activities involve physical training); operations of a trade/occupation; activities associated with an assembly line; military intelligence; and/or the like.

It is therefore intended that the following appended claims and claims hereafter introduced are interpreted to include all such modifications, permutations, additions and sub-combinations as are within their true spirit and scope.

What is claimed is:

1. A method, implemented by a computer, for feedback-driven provision of information in relation to a plurality of information resources, the method comprising:
obtaining a feedback metric related to interaction of a first user with the at least one information resource; and providing output information comprising one or more recommended actions related to the at least one information resource based at least in part on the feedback metric and a mapping of the at least one information resource, wherein providing one or more recommended actions comprises: filtering a state-table records to obtain a subset of the state-table records whose state-actions pairs include states comprising historical actions which match a current state of particular user, the current state of the particular user comprising historical actions of the particular user in relation to the information resources; and selecting at least one of the one or more recommended actions to be an action corresponding to one of the subset of the state-table records having the highest value.

2. A method according to claim 1 wherein the one or more recommended actions for a particular user in relation to the information resources relates to a corresponding recommended one of the information resources.

3. A method according to claim 2 wherein the particular user is different than the first user.

4. A method according to claim 3 wherein receiving the feedback metric comprises receiving a grade resulting from the first user taking an assessment, the assessment comprising one or more questions related to information contained in the information resources.

5. A method according to claim 3 wherein receiving the feedback metric comprises receiving the feedback metric from an instructor based on the instructor's assessment of a level of understanding of the first user of information contained in the information resources.

6. A method according to claim 3 comprising monitoring the actions of the first user by determining that the first user has interacted with a particular set of information resources and wherein receiving the feedback metric comprises receiving an assigned feedback metric after determining that the first user has interacted with the particular set of information resources.

7. A method according to claim 3 comprising monitoring the actions of the first user by determining that the first user has interacted with one or more particular information resources a threshold number of times and wherein receiving the feedback metric comprises receiving an assigned feedback metric after determining that the first user has interacted with the one or more particular information resources the threshold number of times.

8. A method according to claim 3 wherein receiving the feedback metric comprises receiving user-evaluation feedback from the first user, the user-evaluation feedback relating to the first user's perception of the first user's interaction with the information resources.

9. A method according to claim 3 wherein accessing the information resources from the one or more repositories comprises electronically accessing the information resources from the one or more information repositories.

10. A method according to claim 9 wherein the one or more information resource repositories comprise a plurality of information resource repositories, at least two of which are maintained by different entities.

11. A method according to claim 3 comprising monitoring the actions of the first user in relation to the information resources by providing a user interface through which the first user accesses the information resources and logging the actions of the first user through the user interface.

12. A method according to claim 3 comprising monitoring actions of the particular user in relation to the information resources to establish a historical state of the particular user and wherein providing the output information comprising one or more recommended actions for the particular user in relation to the information resources is based at least in part on the historical state of the particular user.

13. A method according to claim 3 comprising:
subjecting the particular user to a diagnostic assessment comprising one or more questions related to information contained in the information resources;
ascertaining one or more questions from the diagnostic assessment which were answered incorrectly by the particular user; and
wherein providing the output information comprising one or more recommended actions for the particular user in relation to the information resources is based at least in part on the one or more incorrectly answered questions.

14. A method according to claim 3 comprising: receiving one or more taxonomy items and, for each taxonomy item, establishing a mapping between the taxonomy item and each of the information resources.

15. A method according to claim 3 wherein providing the output information comprising one or more recommended actions for the particular user comprises providing an action path for the particular user, the action path comprising a structured plurality of recommended actions for the particular used in relation to the information resources.

16. A method according to claim 2 comprising:
monitoring actions of each of a plurality of first users in relation to the information resources;
receiving a plurality of feedback metrics, each feedback metric related to the interaction of a corresponding one of the plurality of first users with the information resources; and
using the received plurality of feedback metrics as a basis for updating values of the state-table records, wherein each feedback metric is used as a basis for updating the values of a corresponding subset of the state-table records which comprises state-action pairs corresponding to the monitored actions of the corresponding one of the first users in relation to the information resources.

17. A method according to claim 1 comprising, maintaining a state table comprising a plurality of state-table records, each state-table record attributing a plurality of values to its corresponding state-action pair, the state-action pair comprising an indication of a series of one or more actions in relation to the information resources, wherein each of the plurality of values maintained in a corresponding value field and wherein at least one of the value fields comprises a personalization value field characterized by an evaluation characteristic.

18. A computer-implemented system for providing feedback-driven information in relation to a plurality of information resources, the system comprising: a feedback interface for receiving a feedback metric related to interaction of a first user with the at least one information resource; and a recommendation engine for providing output information comprising one or more recommended actions related to the at least one information resource based at least in part on one or more of the feedback metric and a mapping of the at least one information resource, wherein providing one or more recommended actions comprises: filtering a state-table records to obtain a subset of the state-table records whose state-actions pairs include states comprising historical actions which match a current state of particular user, the current state of the particular user comprising historical actions of the particular user in relation to the information resources; and selecting at least one of the one or more recommended actions to be an action corresponding to one of the subset of the state-table records having the highest value.

19. A computer program product comprising computer-readable instructions carried on a computer readable medium which, when executed by a processor of a suitable computer, cause the computer to perform a method for feedback-driven provision of information in relation to a plurality of information resources, the method comprising: obtaining a feedback metric related to interaction of a first user with the at least one information resource; and providing output information comprising one or more recommended actions related to the at least one information resource based at least in part on the feedback metric and a mapping of the at least one information resource, wherein providing one or more recommended actions comprises: filtering a state-table records to obtain a subset of the state-table records whose state-actions pairs include states comprising historical actions which match a current state of particular user, the current state of the particular user comprising historical actions of the particular user in relation to the information resources; and selecting at least one of the one or more recommended actions to be an action corresponding to one of the subset of the state-table records having the highest value.

* * * * *